(12) United States Patent
Tse et al.

(10) Patent No.: US 9,388,042 B2
(45) Date of Patent: Jul. 12, 2016

(54) SCALABLE MULTIPLE-INVERSE DIFFUSION FLAME BURNER FOR SYNTHESIS AND PROCESSING OF CARBON-BASED AND OTHER NANOSTRUCTURED MATERIALS AND FILMS AND FUELS

(75) Inventors: Stephen D. Tse, Warren, NJ (US); Nasir K. Memon, Piscataway, NJ (US); Bernard H. Kear, Whitehouse Station, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/984,397

(22) PCT Filed: Feb. 24, 2012

(86) PCT No.: PCT/US2012/026528
§ 371 (c)(1),
(2), (4) Date: Nov. 14, 2013

(87) PCT Pub. No.: WO2012/116286
PCT Pub. Date: Aug. 30, 2012

(65) Prior Publication Data
US 2014/0054505 A1 Feb. 27, 2014

Related U.S. Application Data

(60) Provisional application No. 61/550,028, filed on Oct. 21, 2011, provisional application No. 61/446,789, filed on Feb. 25, 2011.

(51) Int. Cl.
*B22F 9/30* (2006.01)
*C01B 3/24* (2006.01)
(Continued)

(52) U.S. Cl.
CPC ............... *C01B 3/24* (2013.01); *B01D 71/022* (2013.01); *B05D 7/56* (2013.01); *B22F 9/30* (2013.01);
(Continued)

(58) Field of Classification Search
CPC .......... B22F 9/30; F23D 91/02; F23D 14/56; F23D 2900/00001; F23D 29/21007; F23D 14/58; F23D 14/78; F23D 14/22; F23D 14/32; Y02E 20/344; C01B 31/36; C01B 31/0293; C01B 3/22; C01B 3/24; C01B 21/0605; B05D 7/56; B01D 71/022
USPC ...................................................... 423/447.2
See application file for complete search history.

(56) References Cited

U.S. PATENT DOCUMENTS 5,000,779 A * 3/1991 German et al. ................. 75/244
5,498,278 A * 3/1996 Edlund ............................ 96/11
(Continued)

FOREIGN PATENT DOCUMENTS

WO    2009/020952    2/2009

OTHER PUBLICATIONS

Zhuo et al."Synthesis of carbon nanotubes by sequential pyrolysis and combustion of polyethylene", Carbon, 48 (2010) 4024-4034.*
(Continued)

*Primary Examiner* — Stanley Silverman
*Assistant Examiner* — Syed Iqbal
(74) *Attorney, Agent, or Firm* — Robert C. Netter, Jr.; Dann, Dorfman, Herrell & Skillman

(57) ABSTRACT

Apparatus and methods of use thereof for the production of carbon-based and other nanostructures, as well as fuels and reformed products, are provided.

22 Claims, 22 Drawing Sheets

(51) Int. Cl.
*F23D 14/22* (2006.01)
*F23D 14/32* (2006.01)
*F23D 14/56* (2006.01)
*F23D 14/58* (2006.01)
*F23D 14/78* (2006.01)
*B01D 71/02* (2006.01)
*B05D 7/00* (2006.01)
*C01B 3/22* (2006.01)
*C01B 21/06* (2006.01)
*C01B 31/02* (2006.01)
*C01B 31/36* (2006.01)
*F23D 14/84* (2006.01)

(52) U.S. Cl.
CPC ............... *C01B 3/22* (2013.01); *C01B 21/0605* (2013.01); *C01B 31/0293* (2013.01); *C01B 31/36* (2013.01); *F23D 14/22* (2013.01); *F23D 14/32* (2013.01); *F23D 14/56* (2013.01); *F23D 14/58* (2013.01); *F23D 14/78* (2013.01); *F23D 14/84* (2013.01); *F23D 91/02* (2015.07); *F23D 2900/00001* (2013.01); *F23D 2900/21007* (2013.01); *Y02E 20/344* (2013.01)

(56) References Cited

U.S. PATENT DOCUMENTS

| | | | |
|---|---|---|---|
| 5,876,683 | A | 3/1999 | Glumac et al. |
| 6,882,094 | B2 * | 4/2005 | Dimitrijevic et al. ..... 313/346 R |
| 6,979,433 | B1 | 12/2005 | Saito et al. |
| 7,157,069 | B2 | 1/2007 | Jurng et al. |
| 7,279,222 | B2 * | 10/2007 | Hearley et al. ................ 428/403 |
| 7,323,034 | B2 * | 1/2008 | Buxbaum ........................ 95/56 |
| 7,335,344 | B2 | 2/2008 | Height et al. |
| 7,371,065 | B2 | 5/2008 | Aigner et al. |
| 7,396,520 | B2 | 7/2008 | Howard et al. |
| 8,845,768 | B2 * | 9/2014 | Wachsman et al. ............... 48/61 |
| 2004/0050207 | A1 * | 3/2004 | Wooldridge et al. ........... 75/362 |
| 2011/0084237 | A1 * | 4/2011 | Wachsman et al. ........... 252/373 |

OTHER PUBLICATIONS

Xu "Investigating Flame-Based Synthesis of Carbon Nanotubes and Metal-Oxide Nanowires", Oct. 2007, Dissertation Rutgers, The state university of New Jersey.*

Rao et al. "Fullerenes, nanotubes, onions and related carbon structures", Mar. 1991, Journal of Applied physics, 69, 7924-7926.*

Xu et al. "Synthesis of carbon nanotubes on metal alloy substrates with voltage bias in methane inverse diffusion flames" 2006 Carbon 44, 570-577.*

Zhuo, et al. "Synthesis of carbon nanotubes by sequential pyrolysis and combustion of polyethylene." Carbon. 2010;48:4024-4034.

Xu. "Investigating flame-based synthesis of carbon nanotubes and metal-oxide nanowires." Rutgers University Electronic Theses and Dissertations. 2007. Accessed on Jul. 20, 2012; Available online 2007. <http://hdl.rutgers.edu/1782.1/rucore10001600001.ETD.000054802>.

Rao, et al. "Fullerenes, nanotubes, onions and related carbon structures." Materials Science and Engineering. 1995;R15:209-262.

Hu, et al. "Experimental and numerical investigation of non-premixed tubular flames." Proceedings of Combustion Institute. 2007;31:1093-1099.

Merchan-Merchan, et al. "Combustion synthesis of carbon nanotubes and related nanostructures." Process in Energy and Combustion. 2010;36:696-727.

Memon, et al. "Scalable Flame Synthesis of Carbon Nanotubes on Substrates." 2010 Materials Research Society Fall Meeting & Exhibit. Nov. 29, 2010; Abstract C4.10. Accessed online Aug. 8, 2013. <http://www.mrs.org/f10-abstract-c/>.

Osler, F., et al., "Sheet-Like Carbon Particles with Graphene Structures Obtained from a Bunsen Flame," Carbon (2010) 48:4203-4206.

* cited by examiner

A

Water

Porous Medium

B

SCALABLE MULTIPLE-INVERSE DIFFUSION FLAME BURNER FOR SYNTHESIS AND PROCESSING OF CARBON-BASED AND OTHER NANOSTRUCTURED MATERIALS AND FILMS AND FUELS

This application is a §371 application of PCT/US2012/026528, filed Feb. 24, 2012, which claims priority under 35 U.S.C. §119(e) to U.S. Provisional Patent Application No. 61/446,789, filed on Feb. 25, 2011, and U.S. Provisional Patent Application No. 61/550,028, filed on Oct. 21, 2011. The foregoing application is incorporated by reference herein.

This invention was made with government support under Grant No. W911NF-08-1-0417 awarded by the Army Research Office, under Grant No. N00014-08-1-1029 awarded by the Office of Naval Research, and under Grant No. CTS-0522556 awarded by the National Science Foundation. The government has certain rights in the invention.

FIELD OF THE INVENTION

This invention describes apparatus and methods for the synthesis and processing of nanostructured materials and articles derived thereof as well as fuel reforming.

BACKGROUND OF THE INVENTION

Carbon-based nanostructures and films define a new class of engineered materials that display remarkable physical, photonic, and electronic properties. Graphene is a monolayer of $sp^2$-bonded carbon atoms in a two-dimensional (2-D) structure. This layer of atoms can be wrapped into 0-D fullerenes, rolled into 1-D nanotubes, or stacked as in 3-D graphite. Graphene and carbon nanotubes (CNTs) exhibit unique electronic and photonic properties, high thermal conductivity, and exceptional mechanical properties. Diamond, comprised of $sp^3$-bonded carbon atoms, is well known for its extreme hardness, high thermal conductivity, wide band gap, and large optical dispersion.

Recently, the discovery of graphene by micro-cleaving has generated intensive experimental research into its fabrication. Production methods that currently exist include ultrahigh vacuum (UHV) annealing of SiC, and chemical vapor deposition (CVD). Common techniques for CNT fabrication include plasma-arc discharge, laser ablation, and CVD. Methods for the synthesis of fullerenes include electrode-arc processes.

Although these methods have met with some success, they are not readily or economically scalable for large-area applications or may be subject to batch-to-batch inconsistencies. Combustion synthesis has demonstrated a history of scalability and offers the potential for high-volume continuous production at reduced costs. In utilizing combustion, a portion of the hydrocarbon gas provides the elevated temperatures required, with the remaining fuel serving as the hydrocarbon reagent, thereby constituting an efficient source of both energy and hydrocarbon reactant. This can be especially important as the operating costs for producing advanced materials, especially in the semiconductor industry, far exceed the equipment costs. Various morphologies of CNTs, carbides, and semiconducting metal-oxide and carbide nanowires have been produced using air-fuel combustion-based configurations, using both aerosol and supported-substrate methods.

The growth of these nanostructures and films over large areas remains especially challenging. Moreover, current processing methods can be complex, while still characterized by low growth rates and low total yield densities. Accordingly, it is evident that there is a strong need for better methods of synthesizing nanostructures, particularly carbon-based nanostructures.

SUMMARY OF THE INVENTION

Apparatus and methods for processing nanostructures (e.g., carbon-based and other oxide, carbide, nitride, boride, and silicide phases, or mixtures thereof) and articles derived therefrom are provided. The apparatus can also be used for fuel reforming (e.g., hydrogen or syngas generation from natural gas).

In a particular embodiment, the method comprises reacting an oxidizer and a fuel in a non-premixed, multiple, inverse-diffusion-flame burner. The non-premixed, multiple, inverse-diffusion-flame burner may comprise an array of stabilized flames that form a uniform flat-flame front.

In a particular embodiment, the pyrolysis species exiting the non-premixed, multiple, inverse-diffusion-flame burner are directed onto substrates or particles to form films, coatings, and preforms. In another embodiment, the pyrolyzed species exiting the non-premixed, multiple, inverse-diffusion-flame burner are quenched to generate nanostructured particles by a vapor condensation mechanism. The pyrolyzed species exiting the non-premixed, multiple, inverse-diffusion-flame burner may also be used to infiltrate a porous preform. In a particular embodiment of the instant invention, the pyrolyzed species exiting the non-premixed, multiple, inverse-diffusion-flame burner provides heating, fluidization, and precursor loading for micron-size particles. The pyrolyzed species exiting the non-premixed, multiple, inverse-diffusion-flame burner may also be used to provide heating, levitation, and coating of flat substrates.

In accordance with another aspect of the instant invention, methods of synthesizing molecular hydrogen or a syngas are provided. In a particular embodiment, the molecular hydrogen or a syngas is synthesized by reacting an oxidizer and a fuel in a non-premixed, multiple, inverse-diffusion-flame burner.

In accordance with another aspect of the instant invention, methods of converting natural gas into hydrogen and syngas are provided.

In accordance with another aspect of the instant invention, porous ceramic honeycomb structures, e.g., ones that are configured for extraction of hydrogen from reformed diesel fuel and other hydrogen-rich gases, are provided. Methods for extracting hydrogen are also provided. In a particular embodiment, the porous ceramic honeycomb structure is infiltrated with a Pd alloy (e.g., a Pd/Ag alloy, more particularly Pd/20 Ag) to form a thin coating. The Pd alloy coating may be sintered to full density in order to provide a path for selective hydrogen diffusion and efficient hydrogen extraction and/or a path for hydrogen diffusion through the nanograined structure and along its grain boundaries. The Pd alloy coating may have a nanocrystalline structure, thereby enhancing hydrogen permeability by grain boundary diffusion. In a particular embodiment, the porous ceramic honeycomb structure is coated by a dip coating procedure with the application of pressure to ensure infiltration into the open porous structure. The Pd alloy coating (e.g., a nanocrystalline Pd/20 Ag membrane) may also serve to enhance the strength of the alloy without compromising toughness.

In accordance with another aspect of the instant invention, inverse-diffusion flame (IDF) burners (e.g., ceramic burner) that comprise a reconfigured catalytic converter are provided. In a particular embodiment, the reconfigured catalytic converter provides separate feed streams for oxidizer (e.g. air or oxygen) and fuel (e.g. methane or ethane). The issuing oxidizer and fuel feed streams may be ignited to form a uniformly flat flame. In a particular embodiment, the IDF burner is configured as a catalytic reactor. The catalyst material may be in the form of, without limitation, a thin section of catalyst-impregnated honeycomb structure, a catalyst-coated metal mesh, or a bed of catalyst-particle aggregates (extrudates). In a particular embodiment, the catalyst material (e.g., high-surface-area catalyst) is located in the flame, particularly the hot zone of the flame, such that the resulting pyrolysis species generate, for example, various gaseous products, including hydrogen and syngas. Scaling of the technology may be accomplished, for example, by laying several identical IDF burners side-by-side to form any desired size, shape or form.

According to another aspect of the instant invention, methods for fabricating diamond-strengthened composites are provided. In a particular embodiment, the method utilizes an inverse-diffusion flame (IDF). The method of the instant invention may comprise the steps of: depositing a very thin coat of Fe or other catalyst on a substrate (e.g., nanocrystalline) by thermal decomposition of a metalorganic precursor (if necessary); growing a thin coat of diamond (e.g., nanocrystalline) on the Fe-coated (or other catalyst-coated) substrate by low-temperature (e.g., <500° C.) thermal decomposition of a hydrocarbon precursor; and growing a thicker coat of diamond (e.g., textured microcrystalline) on the thin diamond-coated substrate by high-temperature (~1000° C.) thermal decomposition of a hydrocarbon precursor. The metalorganic precursor may be a volatile Fe-rich compound such as iron pentcarbonyl or ferrocene, or other element based compound. The hydrocarbon precursor may be a volatile C-rich compound such as methane or ethylene. The process may be used to apply diamond (and other hard materials (e.g., SiC, TiC, boron carbide (B4C), c-BN, etc.)) coatings to fiber materials (e.g. C or SiC), woven-fiber materials, nano-fibrous materials, or film/sheet materials (e.g. polymer, metal, or ceramic). The diamond-coated fibers may be used to fabricate fiber-reinforced polymer-matrix composites (PMCs), metal-matrix composites (MMCs), or ceramic-matrix composites (CMCs). The diamond-coated film/sheet materials may be used to fabricate laminated polymer-, metal-, or ceramic-matrix composites. Woven-fiber materials may be infiltrated with diamond to form rigid diamond-reinforced composites that contain residual porosity or infiltrated with diamond by varying the gas flow rate (residence time) to obtain uniform through-thickness deposition. In a particular embodiment, when the composite comprises residual porosity, the pores are filled by pressure-infiltration of a compatible liquid phase (e.g. Si or Ti).

In a particular embodiment, carbon nanotubes (CNTs) or silicon-carbide nanotubes (SiCNTs) are coated with thin/thick films of diamond. The diamond-coated CNTs or SiCNTs may be used to fabricate D/CNT-reinforced PMCs or D/SiCNT-reinforced CMCs. In a particular embodiment, the CNT component of the diamond-coated CNT is removed (e.g., by selective gasification in a hydrogen-rich gas stream), thereby forming diamond nanotubes (DNTs). The DNTs may be used to reinforce PMCs or CMCs.

BRIEF DESCRIPTIONS OF THE DRAWING

FIGS. 1A-1C provide schematics of a multiple inverse-diffusion flame reactor for synthesizing nanostructured carbon-based materials. FIG. 1D shows a staged burner with two levels of multiple inverse-diffusion flames. FIG. 1E shows a staged burner where the second stage can be inert, dopant, or other reactant.

FIG. 2 provides schematics of a flame-condensation reactor (FIG. 2A), a flame-infiltration reactor (FIG. 2B), a flame-fluidization reactor (FIG. 2C), a flame-levitation reactor (FIG. 2D), and a flame-reforming reactor (FIG. 2E).

FIG. 3 provides an image of multiple inverse diffusion flames in an ethylene-rich environment.

FIG. 4 provides images of CNTs grown on a Fe substrate.

FIG. 5 provides images of CNTs grown on a Ni/Cr/Fe substrate.

FIG. 6 provides an image of CNTs grown on a Ni/Ti substrate.

FIG. 7 provides an image of CNTs grown on a Ni substrate.

FIG. 8 provides an image of multiple inverse diffusion flames in a hydrogen/ethylene rich environment.

Figure 11:
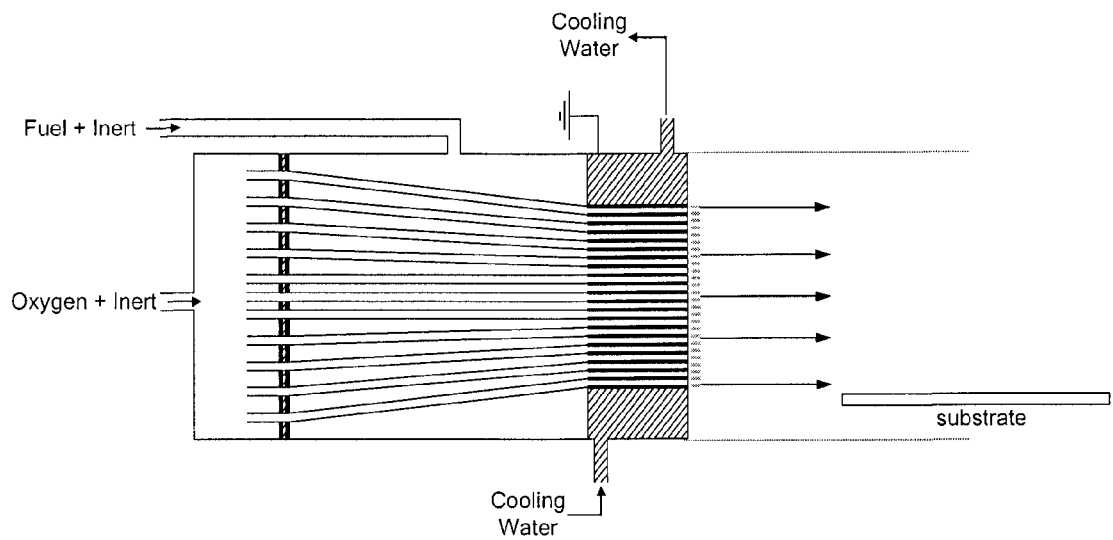

FIG. 11 provides a schematic of an alternate arrangement of the setup for CVD-type growth.

Figure 12A:
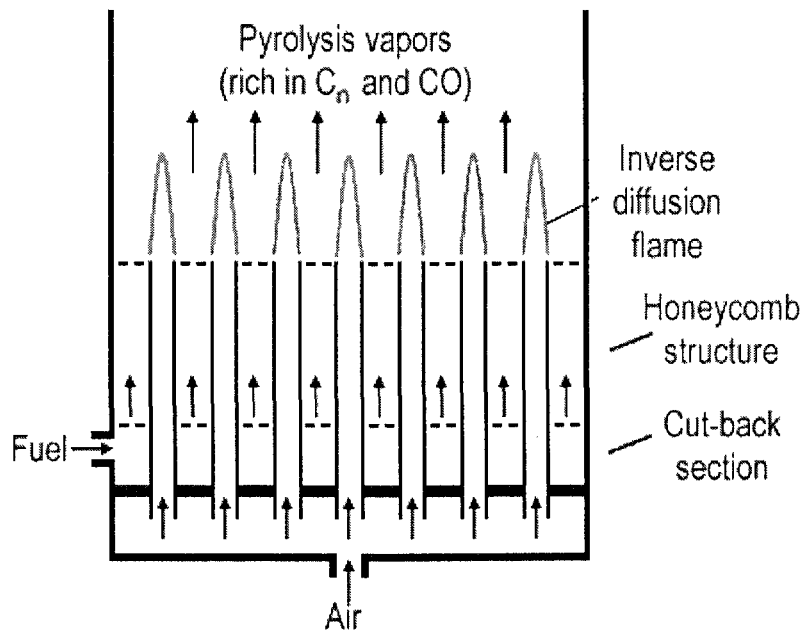
Figure 12B:
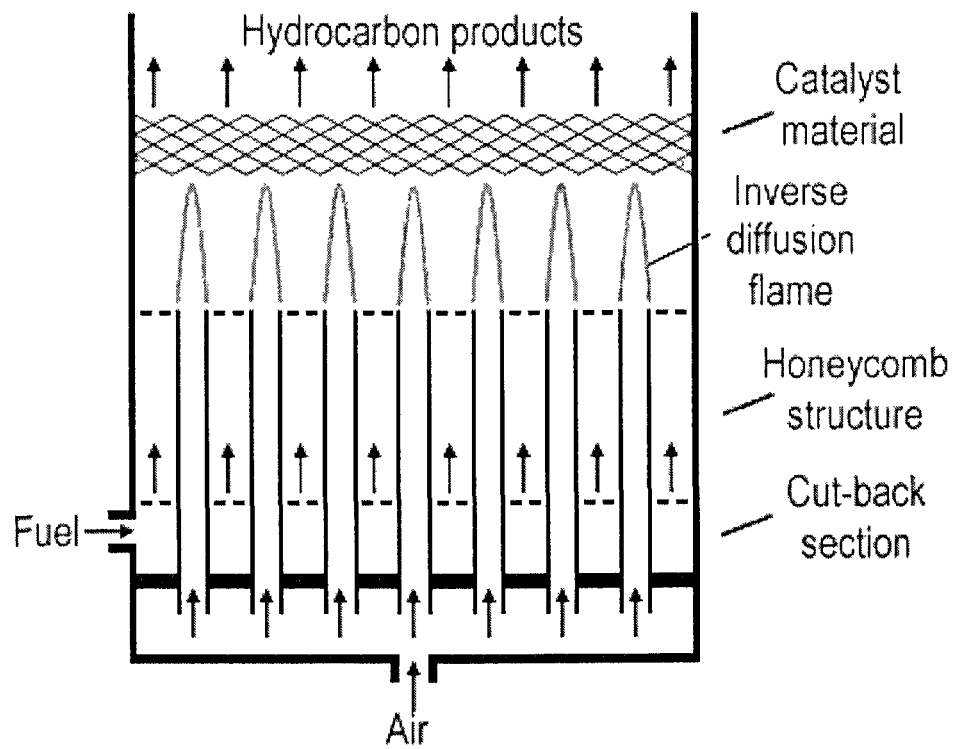

FIG. 12A provides a schematic of a ceramic honeycomb structure, modified to satisfy the requirements of an inverse-diffusion flame (IDF) burner, showing separate chambers for delivery of fuel and air to an array of tiny flames. FIG. 12B provides a schematic of an IDF burner, reconfigured as a catalytic reactor, showing location of catalyst material in the hot zone of the flame.

Figure 13:
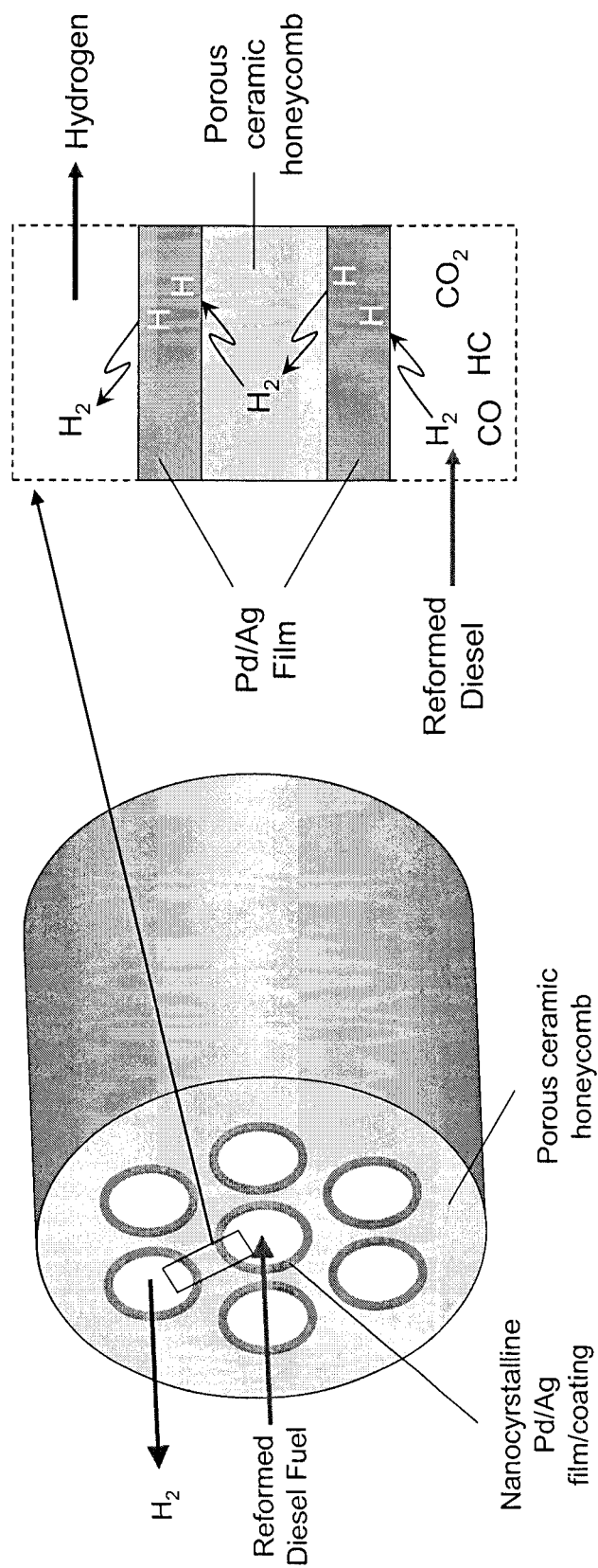

FIG. 13 provides a schematic of a design for a hydrogen extractor, with inset showing diffusion of hydrogen through a thin Pd/Ag membrane that is supported on a ceramic honeycomb structure.

Figure 14A:
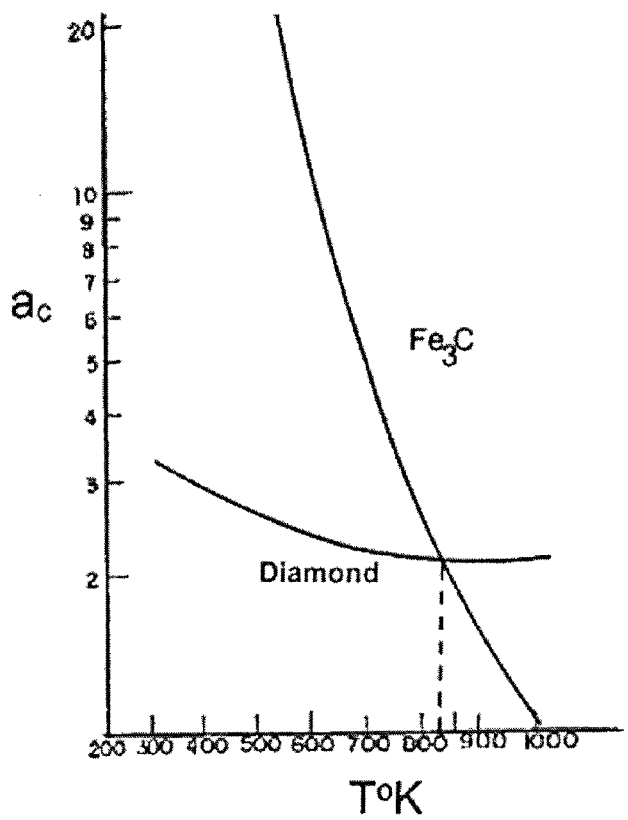
Figure 14B:
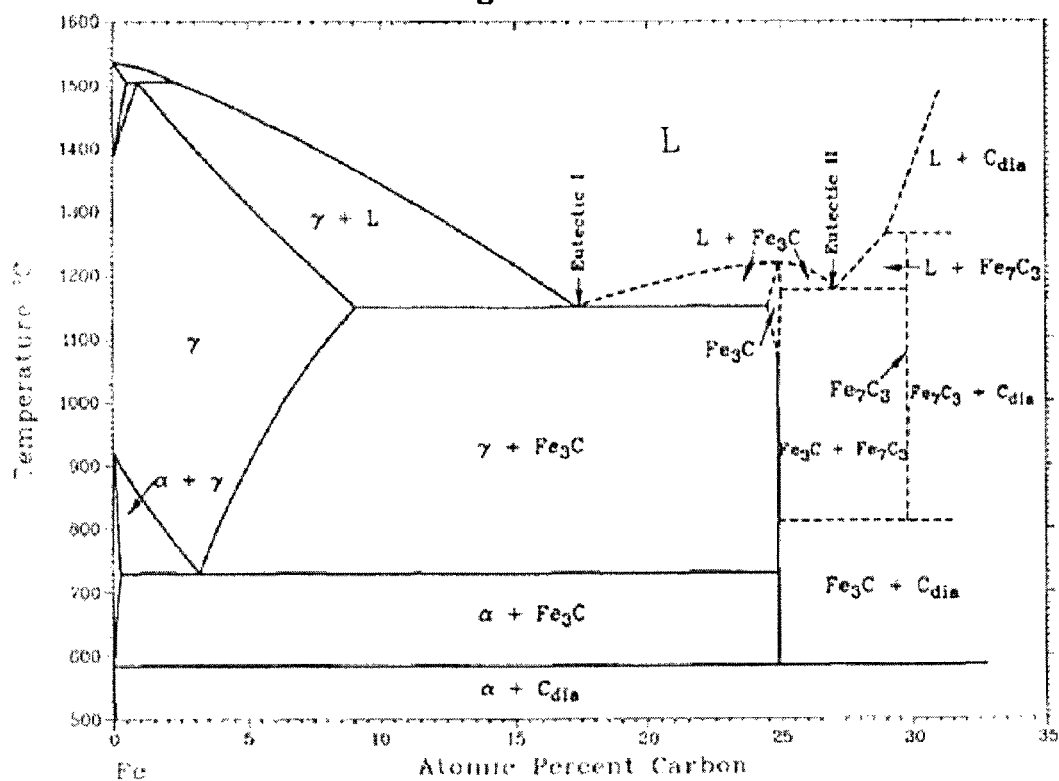

FIG. 14A provides a graph of the temperature dependence of carbon activity ($a_c$) for diamond and $Fe_3C$ (cementite), showing stability of diamond at 840-855° K (~580° C.). FIG. 14B provides a metastable Fe—C phase diagram, showing $\alpha + C_{dia}$ at <580° C.

Figure 15:
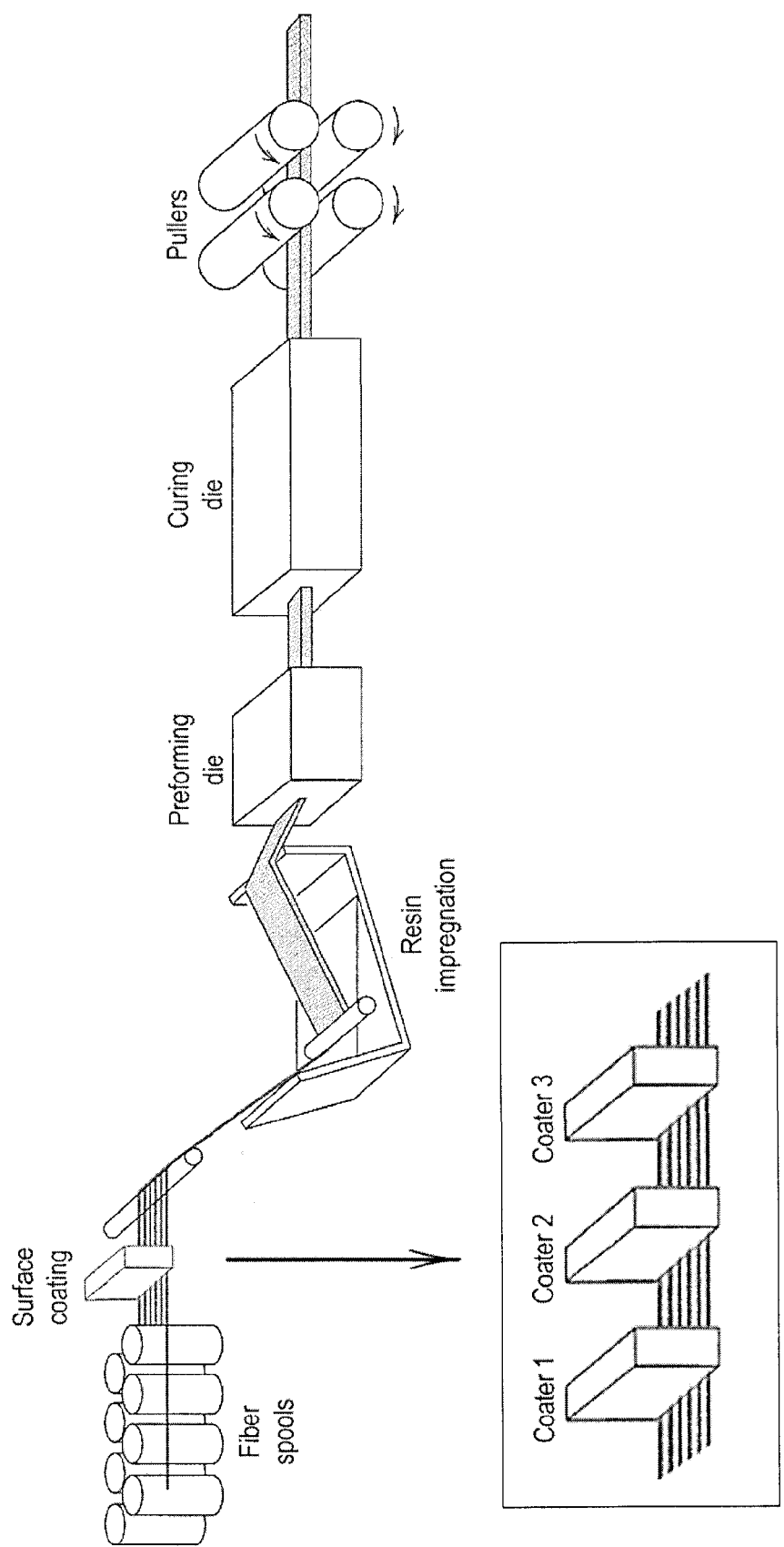

FIG. 15 provides a schematic of a pultrusion process, showing location of IDF coaters.

Figure 16:
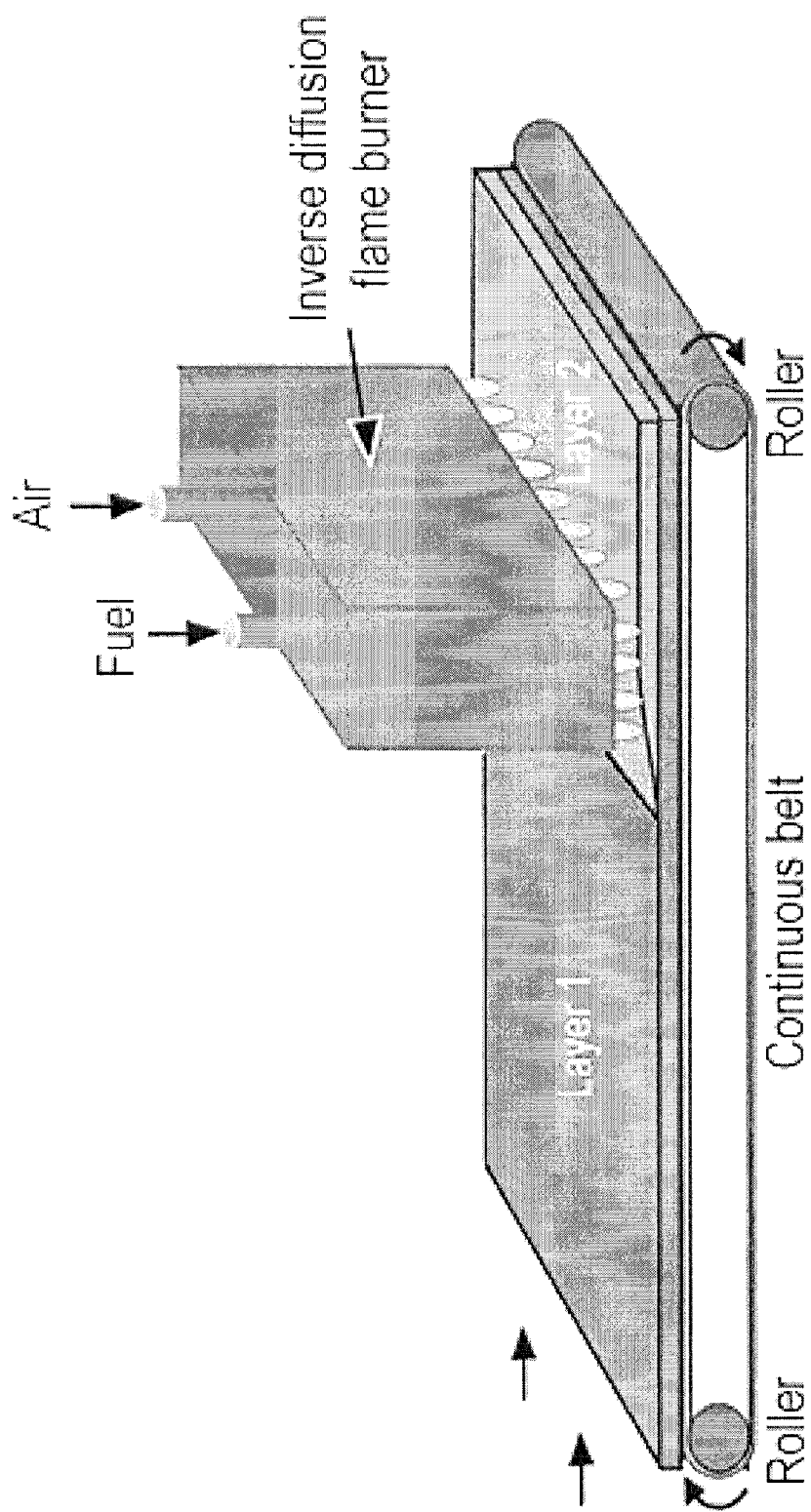

FIG. 16 provides a schematic of a layer-deposition process using an IDF burner.

DETAILED DESCRIPTION OF THE INVENTION

Flame synthesis research may be directed at growing nanostructures and films on substrates, at high growth rates, and in open environments such as ambient air. The instant invention, which utilizes multiple inverse-diffusion (non-premixed) flames, not only achieves the aspects mentioned hereinabove, but also allows for the manufacture of nanostructured powders and films reliably and consistently with specified properties, morphologies, and lay-out architectures for device applications.

The instant invention describes apparatus and methods for the synthesis and processing of nanostructured materials and articles derived thereof. In a particular embodiment, the apparatus consists of a multiple inverse-diffusion (non-premixed) burner, where for each tiny stabilized flame, the oxidizer-feed tube is in the center and an array of fuel-feed tubes surrounds it. The method may involve quenching pyrolyzed species to form nanostructured particulates or depositing pyrolyzed species onto a heated substrate to form nanostructured films, fibers, or coatings. Using various hydrocarbons as fuels, the method may be used to generate carbon-based materials, such as fullerene particles, carbon nanotubes, and graphene sheets. Additions of other precursors to the hydrocarbon and/or hydrogen fuel enable the processing of, e.g., nanostructured oxide, carbide, nitride, boride, and silicide phases, or mixtures thereof. The burner is capable of continuous operation in open and closed environments, and can also be used as a hydrogen or syngas (synthetic gas) generator.

In a particular embodiment of the instant invention, a multiple inverse-diffusion (non-premixed) burner (see, e.g., FIG. 1) is utilized where for each tiny stabilized flame, the oxidizer (e.g., air) is in the center and fuel (e.g. ethylene) surrounds it. Multi-element diffusion flame burners (though not an inverse-diffusion burner) are described, for example, in U.S. Patent Application No. 2004/0050207.

The instant invention encompasses the synthesis of nanostructures (e.g., fibers, films, discs, plates, sheets, flakes, carbon onions, granules, particles, nanotubes, nanowires, etc.), particularly carbon-based nanostructures (e.g., graphene sheets/flakes, carbon nanotubes, and fullerenes), in which the reagents are produced by the combustion process itself. In terms of the fundamental physio-chemical routes involved, the key precursor/reagent species do not have to pass through the reaction zone, affording the synthesis of non-oxide ceramics. Even in the synthesis of oxides, the $H_2O$ and $CO_2$ pathways are isolated (greatly impacting morphology) versus the $O_2$ route specified in Patent Application No. 2004/0050207.

The present invention also encompasses the direct synthesis of nanostructures and films on substrates (solid or liquid) and particles in a readily scalable manner, where either the substrate or the burner itself is moveable via translation or rotation. Pre- or post-treatment of the substrate is also provided by the same burner in an uninterrupted manner, and functionally-graded films can be produced during the synthesis process. External forces (e.g., electromagnetic) can also be applied to yield specific particle morphologies. Additional details of the capabilities and advantages of the invention are described hereinbelow.

As explained in more detail hereinbelow, the instant invention encompasses apparatus and methods for producing nanostructures (such as carbon-based and ceramic (non-oxide and oxide) nanostructures) utilizing a multiple inverse-diffusion (non-premixed) burner. In a particular embodiment, the non-premixed burner comprises an array of tiny stabilized flames that form a uniform flat-flame front. The stabilized flame of the multiple-flame burner may comprise an oxidizer-feed tube in the center and fuel-feed tubes surrounding it. In one embodiment, the oxidizer is air, $O_2$, or any other reducing agent (e.g., fluorine or bromine). The fuel may be a hydrocarbon (e.g., $CH_4$, $C_2H_4$, $C_2H_2$) or any other reagent (e.g., hydrogen, hydrazine, alcohol, acid, etc.). $H_2$ fuels may contain other reactants, thus yielding nanostructured carbides, borides, nitrides, and other phases or mixtures thereof. In a particular embodiment, the fuel is $H_2+SiH_4+CH_4$ or $H_2+SiH_4+NH_3$, thus yielding nanostructured SiC or $Si_3N_4$ particles, fibers, or films.

In a particular embodiment, the post-flame species are largely composed of pyrolysis vapors that have not passed through the oxidation or combustion zone (thus, effectively separating reduction processes from oxidation processes). The pyrolysis vapors may be directed onto a substrate (optionally heated (e.g., moderately)) to form nanostructures. The pyrolysis vapors may contain additives including, without limitation: N-species (e.g., $NH_3$) or B-species (e.g., $BH_3$), to form doped materials. The dopant concentrations may be sufficiently high to form nanostructured phases (e.g., $C_3N_4$, $B_4C$ and BN).

In a particular embodiment, each stabilized flame of the burner is about 1 mm in diameter. In yet another embodiment, the oxidizer/fuel ratio is adjusted to obtain a desired flame temperature, for example: <400° C. (cool flame mode), 800-1400° C., or about 1000° C. The multiple-flame burner may be operated in an ambient-air environment, particularly using an inert-gas (e.g., $N_2$, Ar, He) or tubular metal or ceramic shielding.

The substrate may be liquid or solid. In a particular embodiment, the solid substrate is metallic or ceramic. Examples of solid substrates include, without limitation: copper, alumina, silicon carbide, aluminum nitride, diamond, and the like. In one embodiment, the liquid substrate may be a low melting point metal (e.g., tin or tin-coated copper) or low melting point ceramic (e.g., borosilicate glass). The substrate may also be a thermoplastic or thermosetting resin (e.g., polyacrylonitrile, polymethylmethacrylate, or epoxy). The deposit/substrate interface may be functionally-graded by adjusting fuel composition and flow rates or introduction of precursors for doping.

In another embodiment, the gas velocities (and corresponding flow rates) may be adjusted to achieve specific production rates. Additionally, diverging or converging nozzles can be incorporated into the burner in the post-flame region to tune the velocities at the substrate or particles. The gas flow velocity may be independent of burner diameter and where temperature and chemical species are radially uniform, thus ensuring uniform deposition rates over large areas.

Either the substrate or the burner itself may be moveable (e.g., via translation or rotation), in order to enable continuous production of carbon-based or ceramic (oxide and non-oxide) nanostructures. Additionally, the substrate surface may be pre-treated. In a particular embodiment, the pre-treatment of the substrate surface is provided by the same burner, e.g. for de-scaling of metals by hydrogen reduction.

In a particular embodiment, the pyrolysis vapors exiting the multiple-flame burner are directed onto substrates or particles to form nanostructured coatings (e.g., fibers or films, thereby forming a flame-deposition reactor). The flame-deposition reactor may be used to build up incrementally a nanostructured deposit on a rotating mandrel (e.g., a rotating rod or cylinder).

Figure 1A:
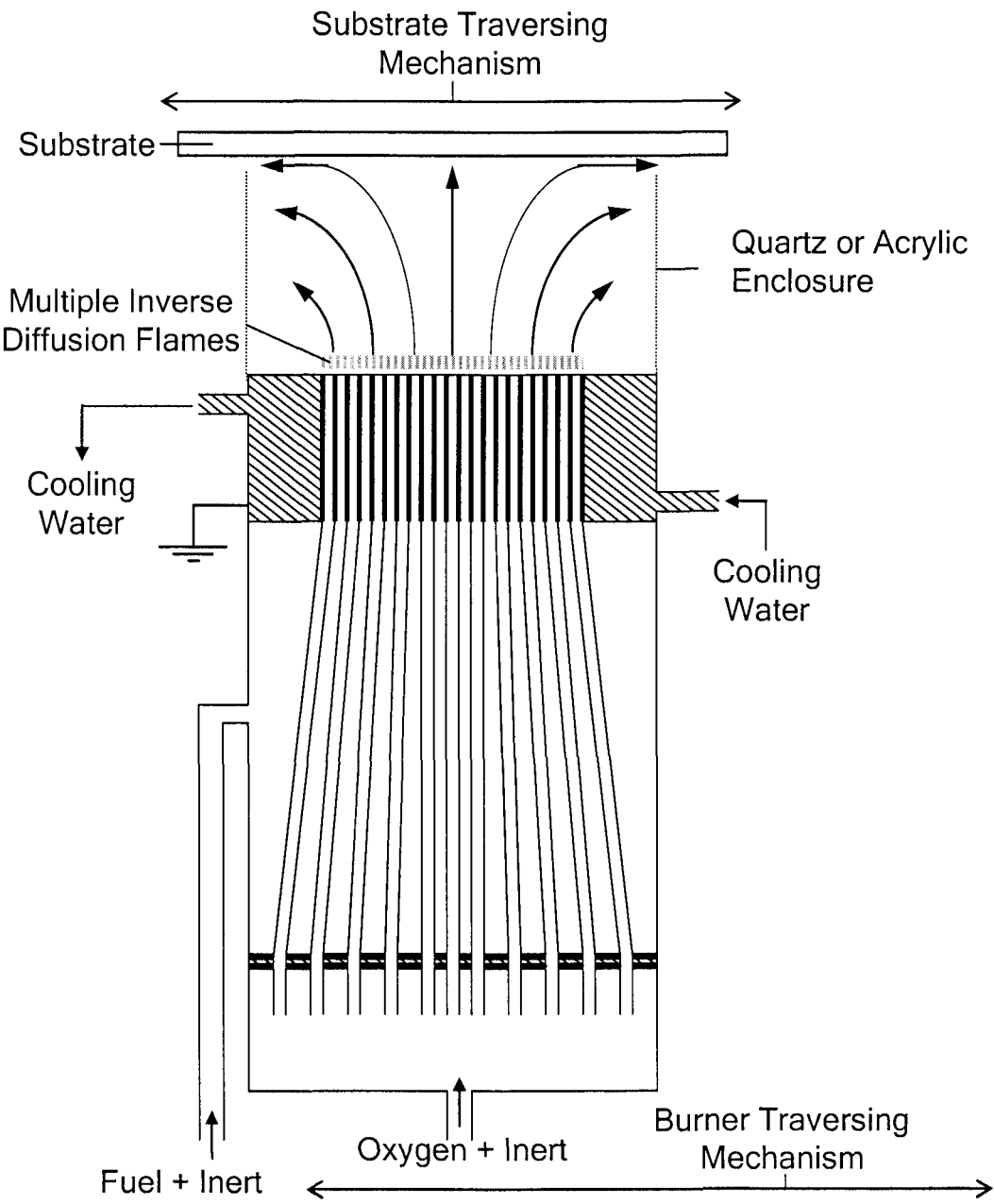
Figure 1B:
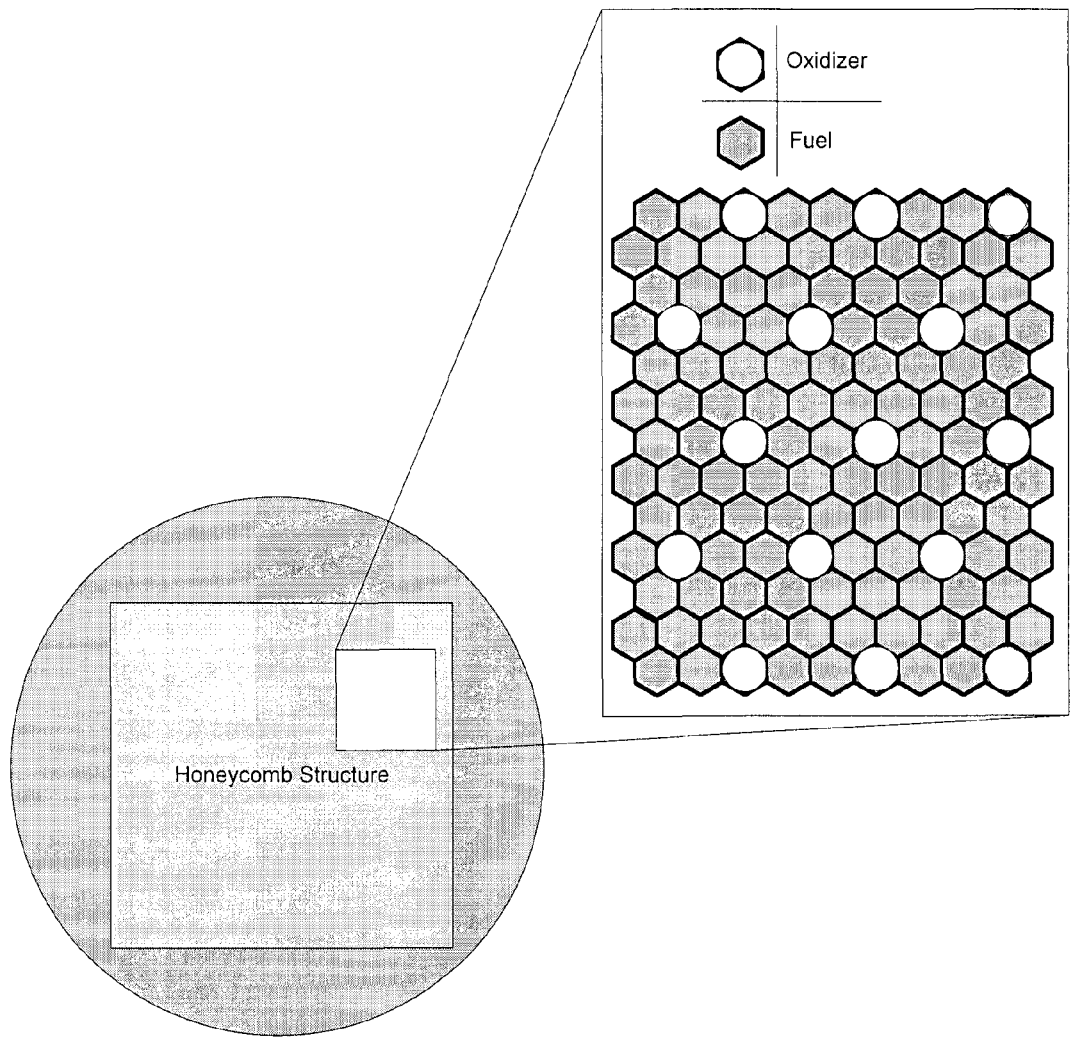
Figure 1C:
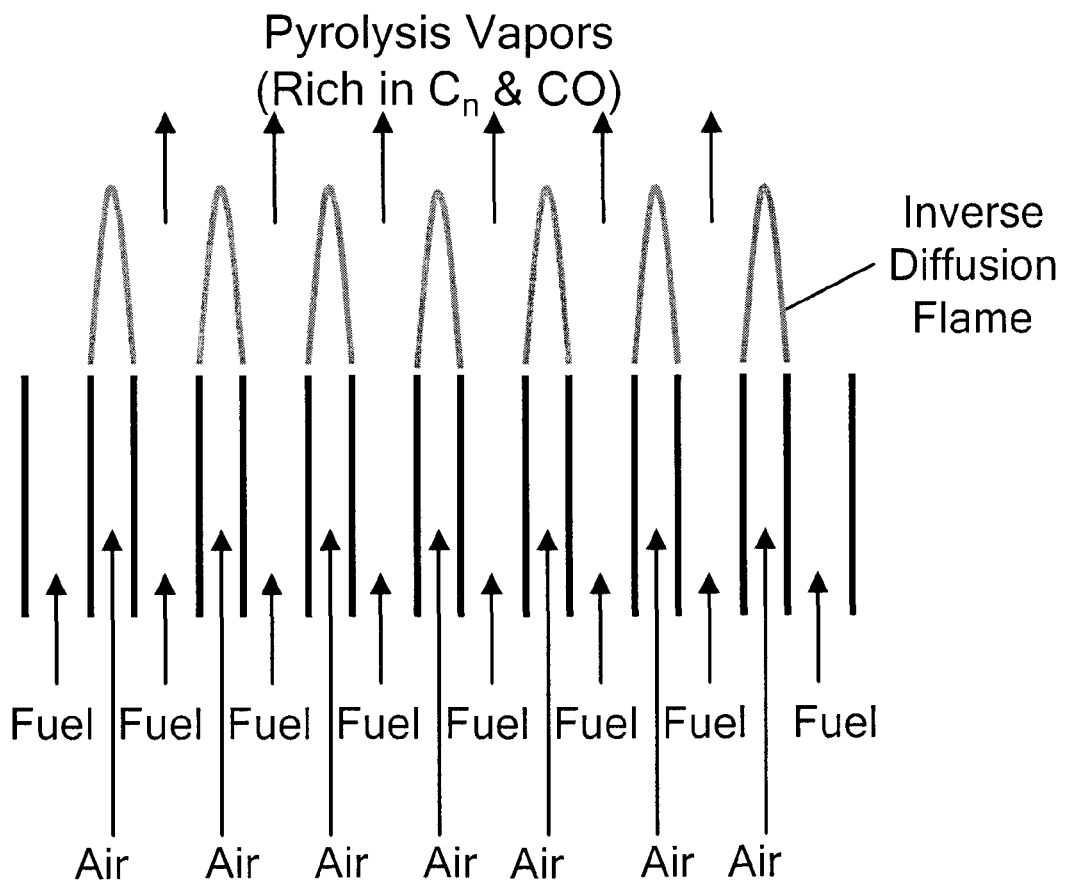
Figure 1D:
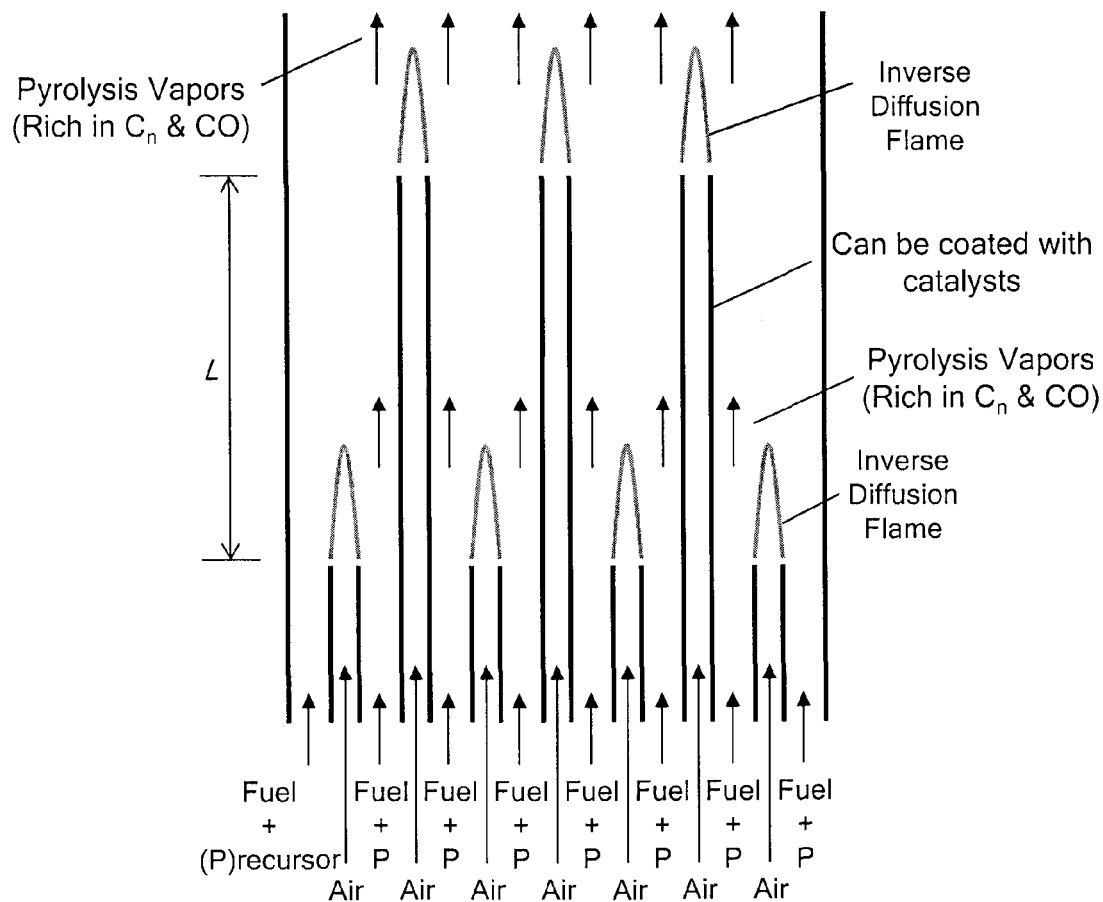

In yet another embodiment, the pyrolyzed species exiting the multiple-flame burner are rapidly quenched to generate nanostructured particles by a vapor condensation mechanism, thus forming a flame-condensation reactor. The rapid quenching of a hot gas stream consisting of pyrolyzed hydrocarbon species (e.g., from $CH_4$ or $C_2H_4$) may be used to generate carbon nanoparticles (e.g., fullerenes, carbon onions, or graphene flakes). In another embodiment, the rapid quenching of a hot gas stream consisting of a mixture of pyrolyzed hydrocarbon and other reactive species (e.g., from $BH_3$, $H_3NBH_3$, $SiH_4$ or $(CH_3)_3SiH$) may be used to generate carbon nanoparticles that are enriched in B, N, Si, or mixtures thereof. In yet another embodiment, the rapid quenching of a hot gas stream consisting of pyrolyzed metalorganic or organometallic precursors is used to generate nanoparticles of carbides, borides, nitrides, silicides, or mixtures thereof. The rapid quenching may be accomplished by directing the hot gas stream onto a chilled metal substrate (e.g., Cu or Al) (e.g., rotating copper wheel or drum), into a cross-flow of cooling gas (e.g., Ar or $N_2$), or into a liquid medium (e.g., water or liquid $N_2$). The as-synthesized nanoparticles may have a narrow particle size distribution. The as-synthesized nanoparticles may be loosely agglomerated or aggregated into larger particles (e.g., submicron-sized) with open or closed nanopores. In another embodiment, multiple stages of multiple inverse-diffusion flames can be formed by extending certain tubes. FIG. 1D shows two levels of flames, however multiple levels can be established. Such staging allows for tuning of residence time and temperature histories for the reactants and pyrolysis species.

Figure 1E:
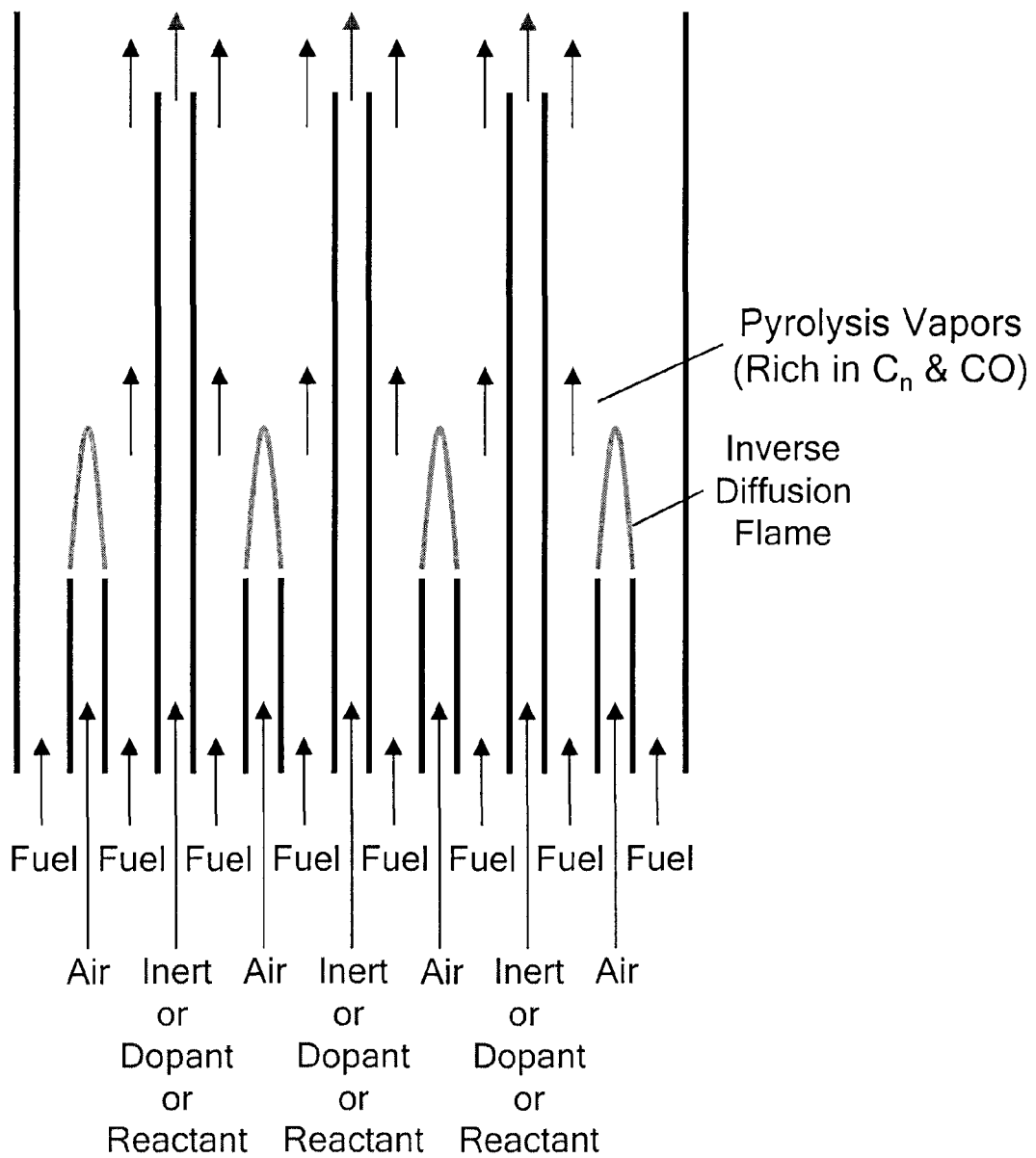

In another embodiment, inert, dopant, or other reactant can be introduced at another level(s) (see FIG. 1E). Introduction of inert(s) can facilitate nanoparticle formation or quenching of specific reactions. Introduction of dopant(s) at a different level allows tuning of residence time for the decomposition kinetics, especially if multiple dopants are simultaneously injected. Similarly, reactant(s), such as methane, can be introduced at another level to achieve specific decomposition kinetics affecting synthesis conditions, for example, in growing monolayer graphene.

In another embodiment, the gas stream exiting the multiple-flame burner is used to infiltrate a porous preform with another phase, thus forming a flame-infiltration reactor. In a particular embodiment, the porous preform comprises aligned or woven carbon fiber. The infiltration component (infiltrant) may be graphene-like carbon, thus forming a C/C composite. In a particular embodiment, the infiltration is carried out with the fibrous structure under a temperature gradient to promote uniform deposition, leaving minimal open porosity in the C/C composite. In yet another embodiment, catalytic growth of CNTs within the pore space of the carbon-fiber preform precedes final infiltration with graphene-like material, thus forming a nano/micro C/C composite. An array of CNTs growing on a substrate may also be simultaneously infiltrated with graphene-like material, thus forming a transverse-reinforced C/C composite. An array of CNTs grown on a substrate may also be flattened (e.g., by rolling), prior to infiltration with graphene-like material, thus forming a longitudinal-reinforced C/C composite.

According to another embodiment, the gas stream exiting the multiple-flame burner provides heating, fluidization, and precursor loading (e.g., carbon-based species or other metalorganics) for micron-size particles, thus forming a flame-fluidization reactor. The pyrolysis species in the hot gas stream may uniformly coat the fluidized bed of particles with nanostructured particles, fibers, or films. By changing the composition of the flame-precursor mixture, the fluidized bed of particles may be uniformly coated with nanostructured core-shell or multi-layered structures. In a particular embodiment, the bed temperature is made more uniform by external heating of the reactor wall. The flow rate of the gas stream may be adjusted to ensure uniform fluidization of the powder bed. A blow-back filter may also be used to prevent the fluidized particles from escaping into the environment, while facilitating disposal of exhaust gases.

In another embodiment, the gas stream exiting the multiple-flame burner provides heating, levitation, and coating of flat substrates, thus forming a flame-levitation reactor. The substrates themselves can translate and/or rotate effortlessly in a continuous coating production mode. In one embodiment, the pyrolysis vapors in the hot gas stream uniformly coat flat substrates with nanostructured particles, fibers, or films. The reactor may direct the gas stream onto a moving belt, thereby enabling continuous fabrication of coated substrates. The sequence of such burners, utilizing different precursor materials, enables the continuous production of multi-layered, doped, or graded nanostructures.

As explained in more detail herein, the nanostructures produced by the apparatus and methods of the instant invention have many uses. For example, the flame-deposition reactor may be used to fabricate large-area films of graphene (single- or multi-layer) or large-area deposits (unidirectional or random weave) of CNTs or nanofibers (metallic, oxide or carbide) or large area diamond films. The graphene films (continuous or patterned) may then be used for electronic, photonic, and other applications. The CNT deposits may be used to fabricate C/C composites and polymer-matrix composites. The diamond films may be used for superhard coatings and corrosion resistance. The flame-deposition reactor may be also used to grow graphene on a template of metal (e.g., Cu) nanowires to form nano-ribbon like structures or used to sublimate Si from a SiC substrate and grow graphene in a hydrocarbon-rich environment.

In addition, the flame-condensation reactor may be used to produce loosely-agglomerated or aggregated carbon nanoparticles for electronic, photonic and other applications. In particular, the loosely-agglomerated graphene flakes (doped and undoped) may be dispersed in a fluid medium to produce an ink for use in fabricating interconnects in printed circuit boards and electronic devices. The open nanopores of aggregated carbon nanoparticles (doped or undoped) may also be surface modified to enhance catalytic and other properties.

The flame-infiltration reactor may also be used to fabricate C/C composites for high temperature structural applications (e.g., gas-turbine engines, rocket engines, and thermal protection systems) and the flame-fluidization reactor may be used to uniformly coat micron-sized particles or granules with nanostructured particles, films, or fibers. The films (coatings) may be superhard materials (e.g., diamond, cubic-BN, and mixtures thereof) or hard materials (e.g., carbides, borides, nitrides, and mixtures thereof). The coatings may be applied to machine tools, mining tools, rock-drill bits, punch and die sets, and bearings to enhance wear performance and to increase service lifetimes. The micron-size particles may have open-porous structures and can be infiltrated with nanostructured particles, films, or fibers. The open pores of activated-carbon may also be infiltrated with high-surface-area CNTs to enhance electrode performance in supercapacitors and batteries. The flame-fluidization reactor may also be used to form powders/flakes of graphene on Cu particles/flakes and may also be used to form powders/flakes of graphene directly from SiC particles via sublimation and/or hydrocarbon deposition.

Additionally, the flame-levitation reactor may also be used for large-area fabrication of nanostructured particles, films, and fibers, with the advantage of lower production costs relative to the flame-deposition rector.

The flame-reforming reactor of the instant invention may also be used to synthesize molecular hydrogen and/or syngas from various fuels, such as methane, natural gas, methanol, gasoline, diesel, JP-8, and biofuels.

The multiple inverse-diffusion flame burner of the instant invention configured as a flame catalytic/reforming reactor is ideally suited for applications in which there is a need to convert natural gas into useful products.

Inverse Diffusion Flames

One feature of the instant invention is the operation of a burner in the multiple-inverse diffusion (non-premixed) flame mode. Each of the diffusion flames is run in the inverse mode ("under-ventilated"), where for each flame the oxidizer (e.g., air or $O_2$) is in the center and fuel (e.g., methane, ethylene, acetylene, etc.) surrounds it. The net effect is that post-flame species are largely comprised of pyrolysis vapors that have not passed through the oxidation zone. In fact, the reaction zone serves as a "getterer," such that the oxygen mol fraction is reduced to $\sim 10^{-8}$ in the post-flame gases.

Carbon formation processes are effectively separated from oxidation processes in inverse diffusion flames, which also tend to soot less than normal diffusion flames. No soot was observed in the multiple-inverse diffusion flame burner of the instant invention under the conditions examined. Moreover, the hydrocarbon species (e.g., rich in $C_n$ and CO), which serve as reagents for synthesizing carbon-based nanostructures and films, are generated in much greater quantities than that achievable in stable, self-sustained premixed flames. By using diffusion flames (burning stoichiometrically in the reaction zone), flame speed, flashback, and cellular instabilities related to premixed flames are avoided. Additionally, unwanted oxidation of precursors (for doping) upstream of the burner is eliminated. Since many small diffusion flames are utilized, overall radially-flat profiles of temperature and chemical species are established down-stream of the burner. Confinement in an inert environment or shielding with an inert co-flow prevents an encompassing diffusion flame to develop.

This novel, robust configuration is well suited for the growth of graphene, CNTs, and fullerenes on substrates, for use, e.g., in devices or as coatings. The non-premixed flame process competes with CVD-type processes in the growth of graphene and CNTs. The present setup allows for faster growth rates due to scalability and high flow rates of precursor species; better control of temperature and reagent species profiles due to precise heating at the flame-front, along with self-gettering of oxygen; and reduced costs due to efficient use of fuel as both heat source and reagent.

The main hydrocarbon fuels include, without limitation, methane, ethylene, and acetylene, along with their blends. $H_2O$ is a main byproduct of hydrocarbon combustion, which may result in unwanted oxidation reactions at elevated temperatures. However, introduction of hydrogen helps to reduce any undesired oxides. Moreover, non-oxide based reactants (e.g., H—Br system) are being investigated.

In a particular embodiment of the instant invention, the flames operating in a partially premixed mode can be run in a cool-flame mode, such that the maximum flame temperature is <400° C., thus permitting deposition of materials on polymers.

Scalability

For a premixed flame burner operating in the laminar regime, to maintain the same Reynolds (Re) number, if the burner diameter is doubled, the issuing velocity must be halved, so that the mass flow rate is only two times larger. Thus, the nanostructure/film production rate is doubled. However, by reducing the issuing flow velocity, the same divergence-stabilized laminar flame cannot be established, since the flame would be stabilized further upstream where the flame speed matches the local flow velocity. Eventually, one would reach the limit of flashback. To circumvent flashback, a burner-stabilized flame could be used, but that could introduce clogging issues due to the use of shower-head-type or porous burners.

Operation of a non-premixed flame burner (as in the instant invention) has no scaling problems by allowing for stability at all burner diameters, where the issuing flow velocity can be independent of the burner diameter. The post-flame gases downstream are quasi 1-D in that they are radially-uniform in temperature and chemical species. Thus, larger burners and substrates can be used, while ensuring uniform growth rates at the substrate. Additionally, the substrates can be placed on a conveyor-belt for high-production throughput or the burner can be translated or rasterized to generate a very large area coating or deposit.

Substrates

According to one aspect of the instant invention, nanostructures and films can be grown on substrates. The substrates can be of various compositions (e.g., metal, non-metal, mixed) and either liquid or solid. Liquids can serve to provide extremely flat surfaces. Rotating the substrates (e.g., in spin coating) to maintain flatness and uniformity of the growth layers is readily accommodated. For example, a thin molten layer of tin can exist on a copper substrate, on which graphene, for example, can be grown. Depending on the temperature that such nanostructures and films can be deposited, the substrate may be a glass or polymer (e.g., polymethyl-methacrylate (PMMA)). Molten glass, based on float-glass technology, can serve as a substrate. The invention is also compatible with current technology on surface modification of plate glass using CVD. Growth on polymer substrates, such as PMMA, would be significant in terms of applications involving transparent materials, such as interlayers in photonic, electronic, or EM-shielding applications. For the semiconductor industry, graphene layers could replace silicon or copper interconnects in devices.

In a particular embodiment, the substrate would have to be pre-treated to remove any oxide layer, e.g. copper substrate for the growth of graphene. The unwanted oxide layer on the metal substrate is removed via hydrogen reduction by using only hydrogen as fuel (>1 global equivalence ratio) in the multiple inverse-diffusion flame burner. After a given period, the fuel is switched over to a hydrocarbon (e.g., to grow graphene) in a continuous manner.

Alloying/doping

Alloying of nanostructures such as graphene with nitrogen and/or boron, as well as other elements, is also encompassed by the instant invention. For example, ammonia ($NH_3$) can be introduced with the hydrocarbon fuel (e.g. $CH_4$) to provide a source of nitrogen, such that the $NH_x$ species formed during flame decomposition are incorporated directly into the graphene structure. Similarly, borane ($BH_3$) or borane-ammonia ($H_3NBH_3$) can be introduced with the hydrocarbon fuel to provide a source of boron and/or nitrogen. It is possible that the hexagonal symmetry of the graphene can be retained, while incorporating boron or boron nitride into the structure. Additionally, halogenation can be applied to incorporate fluorine and other elements into the structure using the appropriate precursors. Properties of the nanostructures may be altered.

The final coating/film may also be nitridized, boronized, carbonized, etc., after the main synthesis phase. With water as a key product species, oxidation of the films (in varying degrees) is possible by controlling the temperature and $H_2$ concentration. In addition, a coating/film can be functionally-graded (in composition and density) by adjusting fuel composition and flow rates (or introduction of precursors for doping) during the synthesis process. Composites and heterostructures are envisioned (e.g. diamond-graphene-CNT).

External Field Application

Recognizing that various parameters affect graphene and CNT properties, the additional degrees of freedom via process inputs from combustion dynamics and electromagnetic field influence become exceptionally useful. Preliminary experiments have shown dramatic increases in the yield of CNTs when electric fields are present. Furthermore, voltage bias has been shown to promote formation of coiled nanotubes, perhaps through altering of local chemical species distributions.

The setup for the instant invention readily permits external electric field application, as well as voltage bias imposed on the substrate, especially if it is metallic (e.g., nickel or copper). The stagnation plane (substrate) that serves as the location for graphene and CNT growth can maintain a voltage bias, which also dictates the overall uniform electric field.

Plasma-assisted combustion (e.g., where an RF-coil encompasses the burner exit region) can aid the synthesis process. Thermal-plasma assistance can raise the gas-phase temperature to alter chemical routes and/or pyrolyze low-vapor-pressure precursors or dopants. Non-equilibrium-plasma assistance can crack specific fuels (e.g., generate hydrogen from hydrocarbons) or pyrolyze precursors/dopants or produce chemical radicals to alter the properties of the as-synthesized materials.

Ceramic Burner and Catalytic Converter

A typical automobile catalytic converter comprises three main components: (1) an extruded ceramic honeycomb core to provide high surface area of contact with the exhaust gas stream; (2) a wash-coat of fine silica and alumina particles to increase the surface area of the otherwise relatively flat core; and (3) an exceptionally high surface area catalyst, such as Pt, Pd or Rh, applied with the wash coat to promote desirable surface reactions. In service, catalytic converters have proved to be mechanically robust, long lasting, and thermal-shock resistant. The latter effect is a consequence of careful texturing of the extruded ceramic. Millions of units have been installed in automobiles and trucks to clean up exhaust systems. Herein, it is described how catalytic converters (e.g., those manufactured by Corning Inc.) can be modified to satisfy the requirements of an inverse-diffusion flame burner, while providing lower fabrication costs and greater operational flexibility. In addition, it is described how a porous ceramic honeycomb structure can be configured for extraction of hydrogen from reformed diesel fuel or other hydrogen-rich sources. The openings of the honeycomb structures of the instant invention can have any shape (e.g., circle, triangle, square, hexagon, pentagon, octagon, irregular, etc.).

In accordance with the instant invention, a conventional catalytic converter can be reconfigured to satisfy the requirements of independent fuel- and oxidizer-feed streams for an IDF burner. As illustrated in FIG. 12A, the lower half of an extruded honeycomb ceramic is cut back to expose oxidizer-feed tubes, which are inserted into holes drilled into a flat plate and sealed with heat-resistant cement, thus forming a fuel-feed chamber. The lower chamber is then closed off to form an air-feed chamber. In a particular embodiment, the multi-tubular ceramic is composed of a uniform array of feed tubes, each <1 mm dia. Thus, the resulting flame is uniformly flat over the entire burner surface. In practice, the flow rates of the separate feed streams are adjusted to achieve the desired combustion conditions, such that a high density of pyrolysis species or free radicals is generated in the combustion zone, as required to form nanostructured particles by quenching the hot gas stream or to form films, coatings, fibers, and free-standing forms by deposition on a heated substrate.

This same ceramic burner may also be configured as a catalytic reactor, FIG. 12B. For example, a thin section of porous honeycomb structure is impregnated with a high-surface-area catalyst and placed in the burner hot zone to promote desired chemical reactions. Alternatively, a catalyst-coated metal mesh or a bed of particle aggregates (extrudates) is used for the same purpose. Interaction between the hot gas stream exiting the burner and the catalyst material generates various gaseous products, depending on the composition of the catalyst material. For example, using methane as precursor feed, IDF-induced pyrolysis in the presence of an appropriate catalyst may generate a liquid fuel (mixture of high molecular weight hydrocarbons). Using specialty catalysts, high yield and selectivity of various hydrocarbon products are also achievable. For production purposes, scaling an IDF burner is important. With this particular burner design, scalability is readily accomplished by laying side-by-side several (e.g., identical) honeycomb structures (square or hexagon shaped) to form any desired burner size, shape or form.

Ceramic honeycomb structures with walls that that contain a high fraction of open or interconnected porosity may be used (see, e.g., Corning). These micro-porous ceramics can be adapted for efficient extraction of hydrogen from reformed diesel fuel, and other hydrogen-rich gases. In the context of the present invention, the hydrogen extractor provides a useful adjunct to IDF-burner technology.

Pd/Ag alloys display significantly enhanced hydrogen permeability relative to Pd. Undesirable phase transitions encountered in cycling Pd in hydrogen are suppressed. Further, Pd/20 Ag offers superior membrane performance. The fabrication of a nanocrystalline Pd/20 Ag membrane can further enhance hydrogen permeability, due to the presence of relatively easy diffusion paths along grain boundaries. The nanocrystalline state can also enhance the strength of the alloy, without compromising toughness.

FIG. 13 shows a design for a ceramic-supported nanocrystalline Pd/20 Ag membrane. A thin layer of mixed or alloyed nanoparticles is incorporated into the ceramic (e.g., by a simple dip-coating procedure), particularly with the application of pressure to ensure infiltration into the open porosity. Both sides of the tubular ceramic may be infiltrated simultaneously, thus forming finger-like networks throughout the ceramic. To ensure an impervious deposit, two, three, or more such dip-coating operations may be performed, with optional intermediate sintering treatments to achieve densification. Thus, any desired thickness of high surface area Pd/20 Ag can be fabricated on a supporting ceramic substrate.

In the design depicted in FIG. 13, hydrogen in reformed diesel fuel, for example, flows through one set of tubes, dissociates on the surfaces of the catalyst particles, and then diffuses to an adjacent set of tubes, where the purified hydrogen is extracted. The diffusion process is driven by the concentration gradient in hydrogen. Various combinations of materials may be used to provide high hydrogen permeability, hydrogen selectivity, temperature stability, corrosion resistance, and structural integrity. A manifold system at the entrance and exit of the extractor allow reformed diesel fuel to flow in and hydrogen gas to flow out.

Because of the exceptional thermal shock resistance displayed by the textured-ceramic substrate, the hot gas stream can be taken directly from the reformer to achieve the desired operating temperature.

Multiple-inverse-flame Reactor Systems

Herein, examples are provided of multiple-inverse-flame processing of nanostructured carbon-based materials and ceramics (non-oxide and oxide), particularly carbon-based materials. In addition, descriptions of several reactor systems are given: (1) flame-deposition reactor; (2) flame-condensation reactor; (3) flame-infiltration reactor; (4) flame-fluidization reactor; (5) flame-levitation reactor; and (6) flame-reforming reactor. the case of carbon-based materials, the description generally describes the processing of fullerene-like particles, carbon nanotubes (CNTs), and graphene films/flakes. Applications for these and other nanostructured ceramic (non-oxide and oxide) materials are encompassed by the instant invention. For example, the incorporation of CNTs in polymer-matrix composites (PMCs) and carbon-matrix composites (CMCs) is discussed.

(1) Flame-deposition Reactor

To fabricate large-area films and coatings of nanostructured carbon, the reactor design depicted in FIG. 1 (called a flame-deposition reactor (FDR)) can be used. In a typical operation, a hydrogen-rich flame heats a flat-metal substrate to a steady-state surface temperature, while removing any oxide scale on its surface. The flame composition is then adjusted by introducing a hydrocarbon fuel (e.g., $CH_4$ or $C_2H_4$), thereby generating a high concentration of active intermediates (e.g. $C_n$ or $CH_n$ species) in the post-flame gas stream. Upon making contact with the heated substrate, the carbon-rich species react to form carbon nanotubes when the substrate is catalytic (e.g., Ni) or graphene films when the substrate is non-catalytic (e.g., Cu). Both solid and liquid substrates may be used, but a liquid substrate (e.g., Sn) may be preferred to facilitate removal of the deposited material after processing. Liquid Sn also offers other advantages: low volatility over a wide temperature range; ease of maintenance of a clean surface for deposition; and minimal reaction with the carbon deposit—there are no known metal-carbide phases.

In the case of graphene deposition on a solid-Cu substrate, the graphene film may be removed by selective dissolution of the substrate or by etching away the deposit/substrate interface. On the other hand, when the graphene is deposited on a liquid-Sn substrate, then the film may be removed mechanically, as in the familiar float-glass process. By modifying deposition parameters (e.g., by increasing deposition rate and/or lowering substrate temperature) graphene in the form of discrete nano-sized platelets may be formed. Applications for platelet- and film-graphene include flat-panel displays and integrated circuits. In particular, formulation of a "graphene ink" seems a particularly attractive proposition, since it would enable direct writing of interconnects (e.g. for integrated circuits and printed circuit boards). Large-area graphene films may also be patterned using laser ablation techniques.

In the case of CNT deposition on a solid-Ni substrate, a particular challenge is to remove the material after processing. Selective dissolution is one option; another is to use tape (e.g., Scotch® Tape). After removal, the CNTs may be randomly dispersed in a polymer matrix phase (actually a monomer that is subsequently cured) to form an isotropically-reinforced PMC. Alternatively, the CNTs are flattened by rolling, and then pressure-infiltrated with the polymer matrix phase to form a unidirectionally-reinforced PMC. In a production operation, the rolling step may be integrated into a well-established pultrusion or pre-preg process. Conventional C-fiber reinforced PMCs are used today in a host of structural applications (e.g., aircraft and space vehicles), where their high specific strengths and woven-fiber designs are exploited to advantage. This new class of CNT-reinforced PMCs further enhances mechanical performance in these and similar structural applications.

(2) Flame-condensation Reactor

Figure 2:
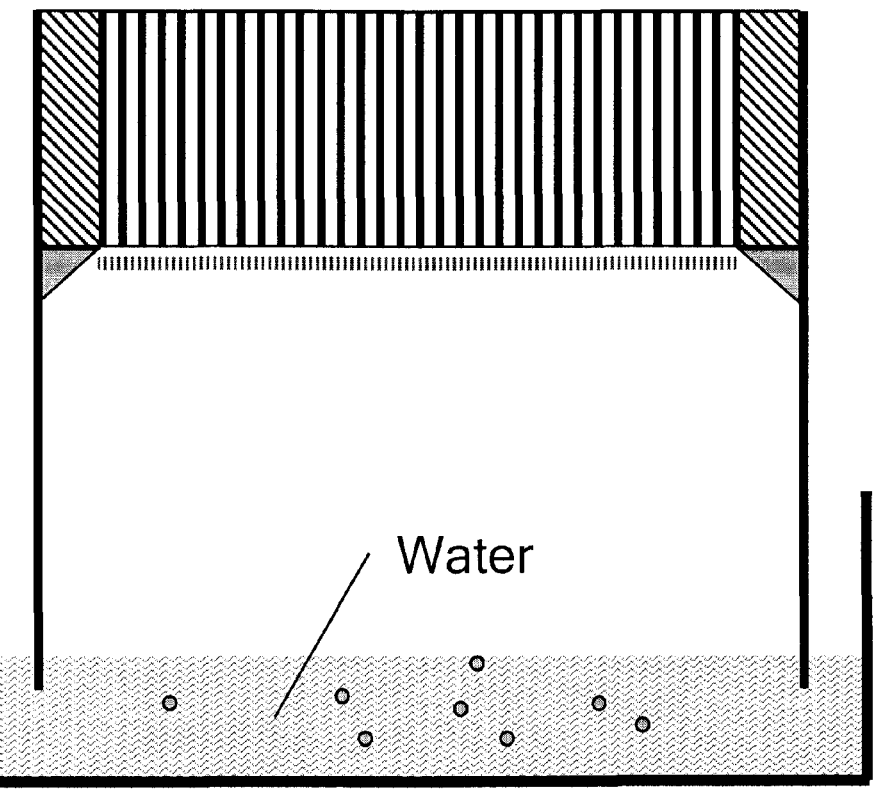
Figure 2:
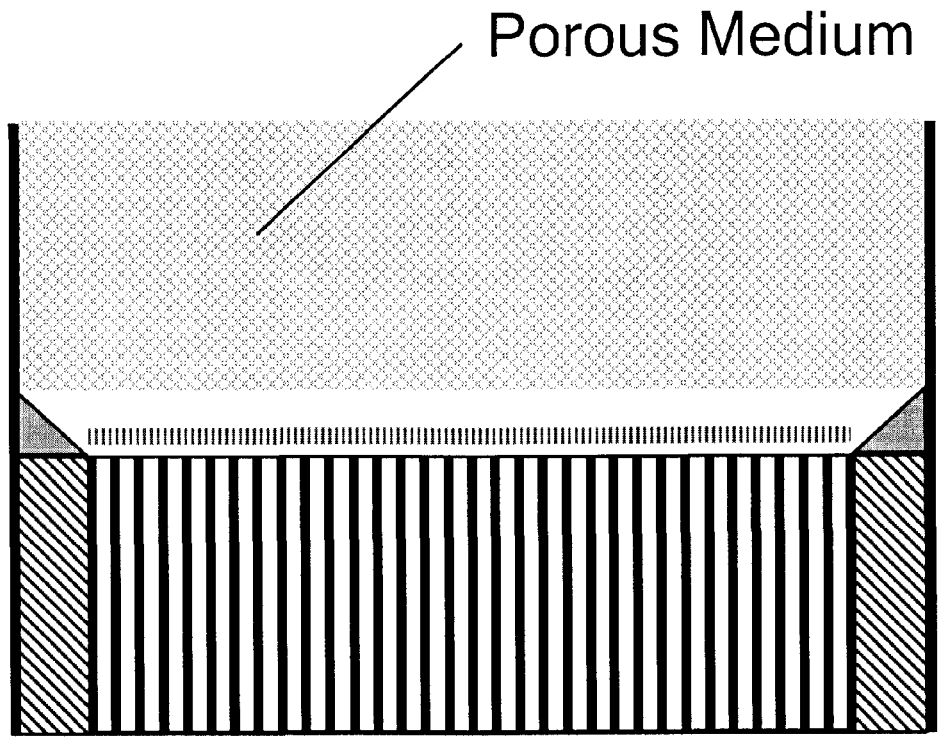

To fabricate nanopowders of carbon-based and other non-oxide ceramics, the reactor design depicted in FIG. 2A, called a flame-condensation reactor (FCR), may be used. In this process, gaseous precursors may be fed into the multiple-flame burner under conditions that generate a high concentration of reactive intermediates in the ensuing gas stream. To generate nanoparticles, the gas stream may be rapidly quenched, for example: (1) on a chilled metal substrate (e.g., rotating copper wheel or drum); (2) using a cross-flow of cooling gas (e.g., Ar or $N_2$); or (3) by injecting the gas stream directly into a liquid medium (e.g., water or liquid-$N_2$). In all three cases, the high quenching rate induces prolific nucleation of nanoparticles while minimizing growth. In general, the as-synthesized nanoparticles (formed by coalescence of tiny clusters) are loosely agglomerated and have a narrow particle-size distribution. However, quenching the gas stream in a liquid-$N_2$ bath may be preferred, owing to the ease with which the nanoparticles can be collected—their separation occurs quite naturally as the liquid $N_2$ evaporates. Quenching in water is also convenient, at least when the nanoparticles are non-reactive or hydrophobic; otherwise post-annealing is necessary to restore the nanoparticles to a pristine condition.

Using a gaseous hydrocarbon feed (e.g. $CH_4$ or $C_2H_4$), rapid quenching of the pyrolysis vapors yields loosely-agglomerated carbon nanoparticles, which may be in the form of fullerenes, carbon onions, or graphene-like platelets (flakes), depending on the specifics of the processing parameters used. Adding another gaseous precursor to the hydrocarbon feed (e.g. $BH_3$ or $H_3NBH_3$) is a means to generate C-rich nanopowders, containing B and/or N in solid solution, with unknown consequences with respect to nanoparticle morphology and intrinsic properties. Similarly, doping fullerenes with Si can be accomplished by adding $SiH_4$ or $(CH_3)_3SiH$ to the hydrocarbon feed. By appropriate selection of metalorganic or organometallic precursors, nanopowders of carbide, boride, nitride, and silicide phases, or mixtures thereof, can also be produced.

Since the multiple-flame burner is readily scalable, the FCR process may be used for high rate production of nanopowders of a wide range of non-oxide ceramics, particularly carbon-based systems, and in a cost-effective manner.

(3) Flame-infiltration Reactor

To fabricate CMC preforms, the reactor design depicted in FIG. 2B, called a flame-infiltration reactor (FIR), may be used. In this embodiment, a preform of PAN-derived carbon fibers, woven as needed to satisfy final structural-design requirements, may be infiltrated with graphene-like carbon using a multiple-inverse-diffusion-flame burner. This may be accomplished in a one-step FIR process, such that the graphene-like carbon is deposited uniformly throughout the entire woven structure. Alternatively, a two-step FIR process may be used, where the growth of CNTs within the open pores of the preform precedes final infiltration with graphene-like material. Both types of CMC display exceptional mechanical properties, but it appears that the hybrid micro/nano-CMC may offer advantages in particularly demanding applications (e.g., aircraft-brake hubs, and thermal protection systems).

Such CMC composites (also known as C/C composites) are typically fabricated by chemical vapor infiltration (CVI). Careful control of processing parameters is needed to ensure uniform deposition throughout the preform (e.g., temperature gradient across the preform), as the pore size diminishes during deposition. Similar control of deposition parameters is needed when using the FIR process, but there are advantages in terms of higher deposition rates, as well as the ability to conduct the operation in an open environment, although a closed environment may be preferred in some situations. There is also an opportunity to use a high precursor-flow rate, thus enabling effective penetration of thick sections. A burner with an array of supersonic micro-nozzles also permits efficient infiltration at high deposition rates.

The FIR process may also be used to fabricate thin/thick sheets of CNT-reinforced CMCs. This may be done by making adjustments to the deposition parameters, such that an array of CNTs continues to grow (grass-like) while being infiltrated with graphene-like material. The net effect is the ability to generate a transverse-reinforced C/C composite. Alternatively, the as-synthesized CNTs may be flattened by rolling, and then subjected to a post-infiltration treatment with graphene-like material to form a longitudinal-reinforced C/C composite. In other words, nanostructured CMC sheets can be fabricated in which the reinforcing CNTs are either aligned perpendicular to the sheet surface or parallel to the sheet surface. This enables the design of CMCs for a host of high temperature structural applications (e.g., in gas-turbine engines, rocket engines, and thermal protection systems).

(4) Flame-fluidization Reactor

Figure 2C:
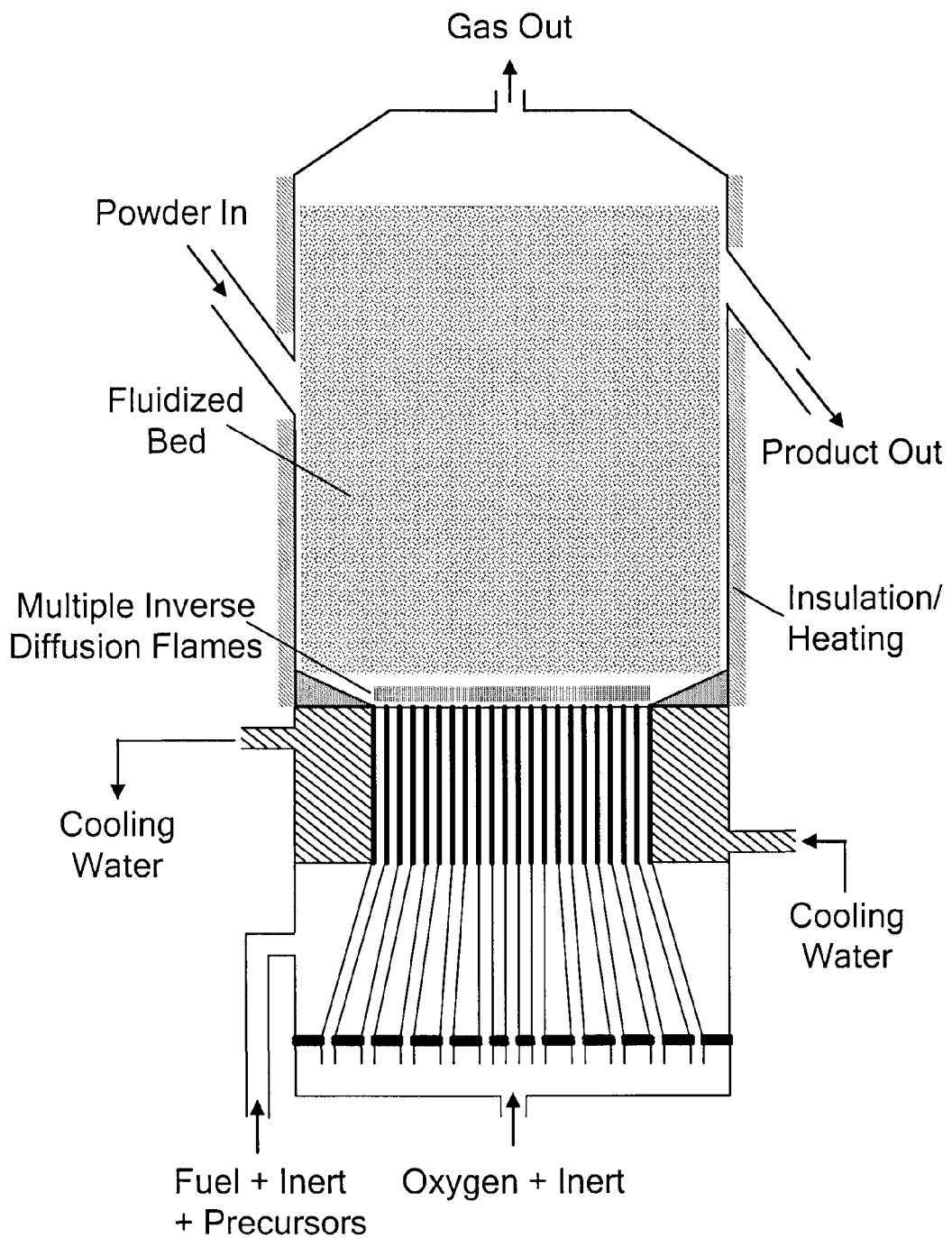

To fabricate coated powders, the reactor design depicted in FIG. 2C, called a flame-fluidization reactor (FFR), may be used. In one arrangement, a heat-resistant ceramic tube is supported on a multiple-flame burner. Thus, the burner provides heating and fluidization, while also generating pyrolysis vapors that form coatings on the fluidized particles. It is noteworthy that rapid heat transfer occurs in the dynamic environment of a fluidized bed, so that uniform temperatures and gas/solid reaction kinetics are established throughout the powder bed. By introducing chemical precursors along with the fluidizing gas stream, all the particles in the bed become coated via a vapor-deposition process. Fluidized-bed CVD has been discussed in the literature, but not using an FFR process.

In one example, activated-carbon granules (e.g., 10-100 µm particle size) form a powder bed, and operating parameters (e.g., temperature, gas-phase residence time, and precursor composition) are adjusted to deposit carbon nanotubes (CNTs) within the open pores of the particles. To promote growth of single or multi-wall CNTs, the activated-carbon powder is pre-treated with a trace amount of a potent catalyst, such as nickel or its alloys. A similar arrangement, but without the catalyst material, is used to infiltrate porous activated-carbon granules with graphene platelets. Such high-surface-area carbon powders may be used to fabricate electrodes for high performance supercapacitors and batteries.

In another example, flame-fluidization of oxide or non-oxide particles (e.g. $Al_2O_3$ or SiC), provides inert substrates on which to deposit ultra-fine catalyst particles (e.g. Pt or Ni), for use in hydrogenation and hydrocarbon conversion processes. The ability to regenerate catalyst materials, using the FFR process, offers significant economic benefits. This same reactor configuration may also be used to fabricate powders with core-shell or multi-layer structures (e.g., SiC-coated $Al_2O_3$ or diamond-coated SiC). Deposition rates using FFR technology are at least an order of magnitude higher than CVD technology (due to characteristic flow velocities that are 1 to 2 orders of magnitude higher), which translates into an economic benefit. Diamond grits of various grades, manufactured by high pressure/high temperature technology, are widely used for grinding and polishing purposes. Diamond-coated SiC grits produced by FFR technology offer a cheaper alternative.

In yet another example, FFR technology may be used to apply shape-conformal coatings to finished parts, whatever their size or shape. Here again, it is the uniformity in temperature and gas/particles reaction kinetics, characteristic of the dynamic environment of a fluidized bed, which ensures uniform coating of all exposed surfaces of the parts. Internal cavities in the parts may also be coated, provided that the gas stream and fluidized particles have access to the interior surfaces. Both overlay and diffusion coatings may be produced, depending primarily on reactor temperature and gas-phase residence time.

(5) Flame-levitation Reactor

Figure 2D:
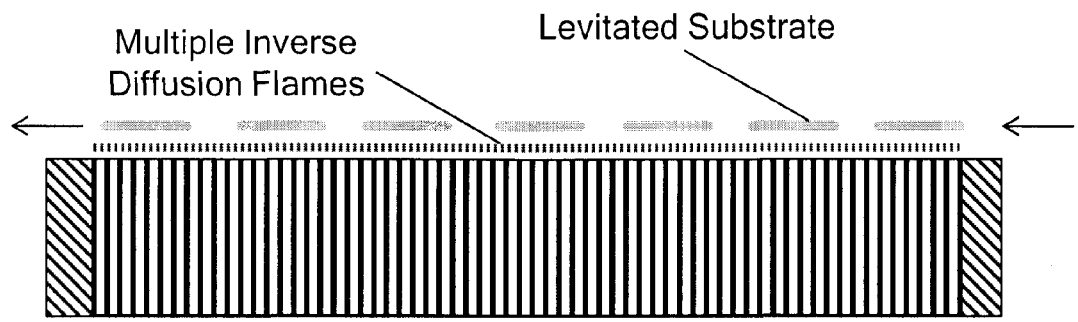

To fabricate thin/thick deposits on flat substrates (e.g., discs, plates or sheets), the reactor depicted in FIG. 2D, called a flame-levitation reactor (FLR), may be used. The hot gas stream emerging from the multiple-flame burner heats and levitates the substrate, while also depositing material via reaction of the pyrolysis vapor with the substrate. Using hydrocarbon fuels, large-area fabrication of CNTs and graphene sheets on supporting substrates can be achieved. For example, a 3-D network or random weave of CNTs can be deposited on a passive substrate, infiltrated with a polymer precursor (monomer) and cured, thus forming a CNT-reinforced PMC in a continuous operation, similar to that discussed above. Uniformly thin films of carbides, borides, nitrides, and silicides (e.g., TiC, $TiB_2$, SiC, $Si_3N_4$, and $B_4C$) can also be processed in a similar manner. Multi-layer deposits can also be fabricated using a sequence of burners that make use of different precursor feed materials. All of this can be accomplished in a cost-effective manner, since the FLR process can be scaled for manufacturing purposes.

To apply thin/thick deposits on powder particles, a modified FLR design may be used. Here, the powder is aerodynamically supported on a multiple-flame burner, comprising one or more channel-shaped sections (modules) of high aspect ratio (length to width ratio). With the burner slightly tilted, powder is introduced into one end of the reactor and gradually moves down the slope at a rate determined by the applicable reaction-processing kinetics, finally exiting at the other end of the reactor. The advantage of this design, compared to a conventional flat-bed reactor (e.g., so-called pusher-furnace reactor), is the more rapid and complete conversion of the initial powder into the end-product powder, since the reactive gases pass through the bed rather than over it. As the exhaust gases flow downstream, they are effectively separated from the reactive gases within the powder bed. Hence, the gas-phase activities of the reactants remain constant during powder processing. Moreover, relatively thick layers of powder are readily accommodated, since the gas permeation though the powder is not limited by thickness. In a typical operation, a steady state condition is first established for the multiple flames emanating from the burner, and then the powder is introduced. This procedure avoids possible clogging of the burner tubes with feed powder. Various burner tube nozzles can be used (e.g., divergent or constriction-expansion nozzles) to optimize powder levitation and transport downstream.

To illustrate the utility of the FLR process, its applicability to the production of nano-WC/Co powder is considered. A simple two-step process may be used. First, a precursor powder may be produced by spray drying an aqueous solution of mixed salts (e.g., ammonium metatungstate and cobalt acetate), thus yielding a homogenous mixed-salt precursor powder, in which the W and Co are intimately mixed at the molecular level. Second, the precursor powder may be introduced into the FLR reactor, where pyrolysis, reduction, and carburization occur in a sequential manner, as the powder travels down the reactor. The final product is nanostructured WC/Co powder, in which the two nanophases are uniformly mixed and in intimate contact. A feature of the process is that each nanocomposite particle, typically about 20-50 µm in size, also contains a high fraction of open nanoporosity. Such porous particles are readily broken down by mechanical milling to about 1-2 µm, making the powder ideal for post-consolidation by liquid-phase sintering, which is standard practice in the hardmetals industry. A similar process may be used to transform bulk WC/Co (e.g., spent machine tools and rock-drill bits) into WC/Co powder. Here, it is preferred to first to powderize the bulk material by oxidation in air at 700-900° C., prior to conversion back into WC/Co powder in an FLR reactor.

Another advantage of the FLR reactor is that additional modules may be added to the production line in order to coat the as-processed WC/Co particles with other components or phases. For example, a nanostructured WC/Co powder may be coated with one or more thin layers of other hard and/or superhard materials (e.g., TiC and/or diamond), thus enhancing its performance as grinding and polishing media. An FLR reactor may also be used to coat micron-sized particles of metals (e.g., Al, Ti or their alloys) or ceramics (e.g., $Al_2O_3$, TiC or their admixtures) with nanostructured powders, fibers or films, as discussed above.

(6) Flame-reforming Reactor (e.g., Hydrogen Synthesis)

Figure 2E:
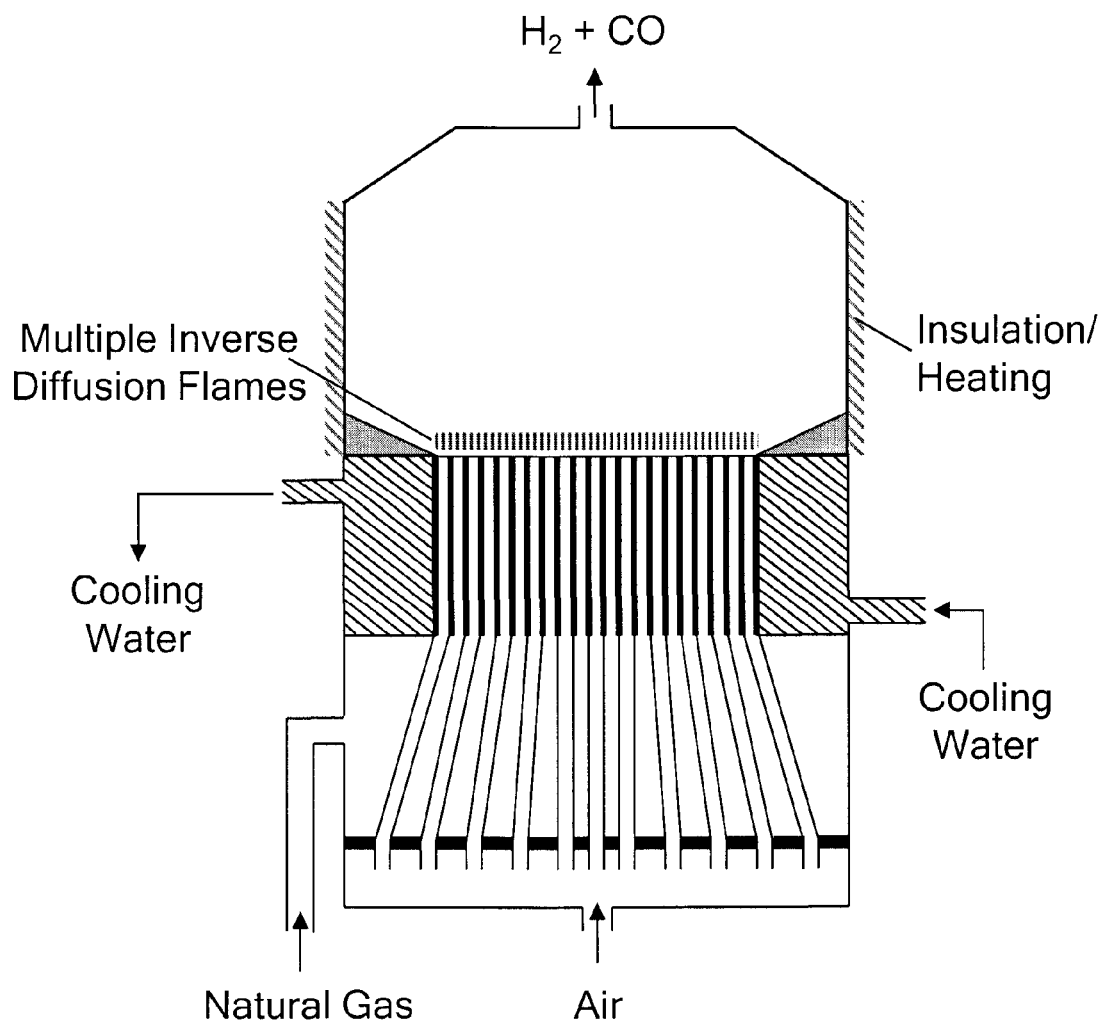

The multiple-flame burner can also be used as a flame-reforming reactor (FRR) (see, e.g., FIG. 2E), to non-catalytically convert hydrocarbon fuels into molecular hydrogen for various applications (e.g., transportation vehicles, energy generation, and fuel cells). With the capability to operate at very large global equivalence ratios (e.g., >4), as well as over a wide temperature range (e.g., 400-2000° C.), the FRR can pyrolyze various fuels (e.g., methane, natural gas, methanol, gasoline, diesel, JP-8, and biofuels), with or without partial oxidation, reforming them into hydrogen or syngas. The reactor can also be operated at elevated pressures in order to optimize the chemical kinetics. Additionally, the reactor can either be large scale for industrial use or mini-sized for portable application. In terms of cost and flexibility of use, the FRR will out-compete current production methods for $H_2$ production from natural gas, such as catalytic partial oxidation and steam-methane reforming.

Method to Fabricate Diamond-reinforced Composites

As described herein, an inverse-diffusion flame (IDF) method to fabricate nanostructured diamond (and other hard materials (e.g., SiC, TiC, B4C, c-BN, and the like)) coatings on heated iron and steel (and other material) substrates is provided. Here, methods to utilize such coatings to enhance the performance of, for example, fiber-reinforced, nanofiber-reinforced, and laminated composites are provided.

An investigation of phase equilibria in the Fe—C system showed that diamond is more stable than $Fe_3C$ (cementite) at ambient pressure (Zhukov and Snezhnoi (1973) Acta Met. 21:199-201). The critical temperature for the phase transition is ~580° C., as shown in a plot of temperature dependence of carbon activity for diamond and Fe3C, FIG. 14A. On the basis of this analysis and other considerations, a modified phase diagram for Fe—C was formulated (FIG. 14B).

Recent research has provided experimental confirmation of the theoretical prediction. Using an IDF burner with methane as precursor, thin film deposition of diamond on iron and steel substrates has been observed at 400-500° C., but not at higher temperatures. On the contrary, at temperatures ~1000° C., carbon nanotubes are formed. Even so, if complete surface coverage of the iron substrate is achieved at the lower temperature, then continued growth at the higher temperatures occurs, resulting in a diamond film with a well-defined <111> texture. In other words, a very thin film of nanocrystalline diamond formed at the lower temperature serves as a template for much faster growth of microcrystalline diamond at the higher temperature. Moreover, the growth rate for the diamond coating at the higher temperature is about two orders of magnitude faster than chemical vapor deposition. Thus, IDF can be used for fabrication of: (1) diamond films or coatings in a one-step operation, yielding nanocrystalline structures; and (2) diamond films or coatings in a two-step operation, yielding <111> textured microcrystalline structures.

In the event that the substrate material is not Fe or steel, an additional up-front step can be used to coat the substrate with a thin layer of Fe to promote the growth of the diamond overlay coating. For example, to coat another metal, glass, ceramic or polymer substrate, a very thin layer of Fe or other catalyst is applied to the substrate to serve as an "activator" for post-deposition of nanocrystalline or microcrystalline diamond, as discussed above. Although both deposition options are permitted for most metal, glass or ceramic substrates, only the low temperature option seems feasible for low melting point polymers. This limits the thickness of nanocrystalline films that can be deposited on polymer substrates, since deposition rates are slower at low substrate temperatures.

Many methods are available for coating substrates with very thin layers of Fe of other catalysts, including pulsed laser deposition, atomic layer deposition, and chemical vapor deposition. In a particular embodiment, the IDF process is used with a metalorganic feed material (e.g. iron pentacarbonyl) delivered to the substrate at a controlled rate. Thus, all the necessary steps required for coating substrates with thin films or coatings of diamond can be accomplished in a fully integrated IDF process, involving first depositing a very thin film of Fe or other catalyst, followed by a one- or two-step diamond-coating treatment to obtain the desired thickness, crystallinity, and/or texturing. Herein, applications for diamond (and other hard materials (e.g., SiC, TiC, B4C, c-BN, and the like)) coatings to enhance properties and performance of fiber-reinforced composites, nanostructured composites, and laminar composites are described.

A. Fiber-reinforced Composites

Conventional fiber-reinforced composite are of generally of three main types: polymer matrix composites (PMCs), metal-matrix composites (MMCs), and ceramic-matrix composites (CMCs). In all three cases, fiber fabrication is a specialized operation, quite separate from actual composite fabrication. Hence, much effort has gone into: (1) fabrication of high specific strength fibers (e.g., carbon fibers derived from pyrolysis of polyacrylonitrile fibers), (2) methods to incorporate the fibers into the matrix phase to impart one- and two-dimensional reinforcement, and (3) computer design of fiber weaves to achieve specific three-dimensional reinforcement of complex shapes. The fibers themselves may be fabricated in single strands or more commonly in bundled forms (tows).

Here, the application of diamond (and other hard materials (e.g., SiC, TiC, B4C, c-BN, and the like)) coatings to available high performance fibers (e.g. C and SiC) is described to further enhance properties and performance of 1-D, 2-D and 3-D fiber-reinforced composites. A new class of nanofiber-reinforced composites, in which the entire processing operation does not involve fiber handling, is provided. In a particular embodiment, the fiber networks are fabricated by vapor-synthesis methods (e.g., catalytic growth of single-walled and multi-walled carbon nanotubes (CNTs)) and then infiltrated with the desired matrix phase using high rate IDF-deposition technology.

1. Polymer-matrix Composites

A typical polymer-matrix composite (PMC) typically comprises a high molecular weight polymer matrix that is reinforced with high specific strength fibers, continuous or discontinuous. Reinforcing fibers include, without limitation, glass, carbon, and aramid, and matrix phases including, without limitation, epoxy resin, polyester, vinyl ester, and polyimide. PMCs are widely used for structural applications because of their good mechanical properties, ease of manufacture, and relatively low fabrication costs. Applications include aerospace components, transportation vehicles, storage tanks, and sporting goods.

Herein, the IDF process operating in a thin film deposition mode may be used to coat bundles (tows) of glass or carbon fibers with diamond, prior to conventional PMC processing. In a particular embodiment, the IDF-deposition process involves three coordinated steps: (1) a very thin coating of Fe or other catalyst is deposited on the fibers by decomposition of iron pentacarbonyl or other precursor; (2) a thin overlay coating of nanocrystalline diamond is grown on the Fe-coated fibers by low-temperature decomposition of a hydrocarbon precursor, such as methane; and (3) a much thicker coating of textured-microcrystalline diamond is grown on the nanocrystalline diamond at a higher temperature and at a much faster rate. Other precursor feed materials may be used, with the choice optionally being determined largely on the basis of availability and cost.

Well-established PMC production methods include pultrusion, prepeg, and filament winding. All three processes lend themselves to pre-coating of fibers with a thin layer of exceptionally strong and stiff nano/microcrystalline diamond, which is also much less fracture prone that monocrystalline diamond. For example, to pre-treat carbon fibers in a pultrusion production operation, a three-step IDF coating process may be used (see FIG. 15). After deposition of the desired thickness of diamond (e.g., 20% of fiber thickness), the fibers are impregnated with a thermosetting resin, pulled through a steel die to obtain the desired shape, and then through a precision curing die to form the final composite product. Almost any constant cross-sectional area product can be manufactured, including tubes and hollow sections using center mandrels or inserted hollow cores. Similarly, the three-step IDF process may be used for pre-treatment of fibers in prepeg, filament winding, and related production operations.

2. Metal-matrix Composites

A typical metal-matrix composite (MMC) comprises a lightweight metal matrix (e.g., Al, Mg or Ti) that is reinforced with high aspect ratio or chopped fibers (e.g., carbon or silicon carbide). Such particle-reinforced MMCs provide high strength and stiffness, isotropic properties, ease of near-net shape fabrication, superior thermal and electrical properties, and affordability. Applications include, without limitation, thermal management and electronic packaging, radiator panels and battery sleeves, power semiconductor packages, microwave modules, black box enclosures, and printed circuit board heat sinks. Continuous-fiber reinforced MMCs have not yet reached their full potential, largely because of manufacturing and assembly problems.

Al-matrix composites are commonly reinforced with chopped carbon fibers. Since Al reacts with carbon at elevated temperatures to form a brittle, water-soluble compound $AlC_3$, the carbon fibers are usually passivated with a thin coating of Ni. In accordance with the instant invention, carbon fibers may be first coated with a very thin layer of Fe to provide a suitable substrate for growth of diamond, according to the two-step protocol described above, i.e. avoiding the third step that is above the melting point of Al. With regard to Mg-base composites, a diamond coating is applied to the SiC fibers, prior to their incorporation into a Mg-alloy matrix.

For higher temperature applications, a SiC-reinforced Ti matrix composite may be used. To mitigate harmful fiber/matrix reaction at high temperatures, the SiC fibers are usually coated with carbon. In a particular aspect of the invention, SiC fibers are coated with the desired thickness of diamond prior to their incorporation into a Ti-alloy matrix. A thin layer of TiC, formed by interphase-interface reaction, enhances load transfer between fibers and matrix, thus increasing composite strength and stiffness.

3. Ceramic-matrix Composites

A typical ceramic-matrix composite (CMC) comprises a uniform distribution of ceramic fibers embedded in a ceramic matrix. Significant property advantages derived from a fiber-reinforced composite are, without limitation: (1) rupture elongations of ||1%, (2) major increases in fracture toughness; and (3) exceptional thermal shock resistance. Fabrication methods include chemical vapor infiltration (CVI), reaction bonding, and polymer pyrolysis. Applications include, without limitation, heat shields for space vehicles, components for gas-turbine engines, brake discs, and sliding bearings.

In a particular embodiment, the CMCs are heat-resistant C/C and SiC/SiC composites, which are reinforced with aligned, cross-plied or woven fibers. Chemical vapor infiltration (CVI) may be used as the fabrication method. To fabricate a C/C composite, for example, a woven C-fiber preform can be exposed to an argon/methane mixture under pressure at high temperature (e.g., 100 kPa at 1000° C.). The methane experiences rapid thermal decomposition, depositing amorphous-like carbon on and in-between the fibers. Thus, the open space between the fibers is gradually filled, finally forming a rigid C/C composite, albeit with about 10-15% residual porosity; the latter is subsequently reduced to about 2-3% by liquid Si infiltration. To fabricate a SiC/SiC composite, a similar method may be used, except for the substitution of a Si-rich metalorganic compound (e.g. tetramethylsilane) as precursor material.

In this invention, infiltration of a woven C or SiC preform may be accomplished using the three-step IDF process described above. For example, a woven preform may be placed in the hot zone of the burner, and subjected to IDF infiltration to obtain a uniform deposit of diamond (D) on all the fibers. The process is continued until the open spaces between the fibers are nearly filled, thus forming a porous D/C or D/SiC composite. As discussed above, this may be reduced to a few percent by pressure-assisted infiltration with liquid Si. Reaction of the liquid Si with the diamond to form a very thin layer of SiC may occur, but this should not seriously impair mechanical performance. On the other hand, the presence of a significant fraction of diamond in the composites should dramatically increase hardness, bend strength and stiffness, without significantly reducing fracture toughness. As is well known, the latter is determined by the degree to which fiber pull-out occurs during fracture, which is controlled by fiber/matrix bond strength. Many variations of this approach can be envisioned, including infiltration with few-layer graphene to increase toughness of the D/C or D/SiC composite. This is because an advancing crack should cause delamination of the graphene just ahead of the crack tip, thus arresting its propagation.

For a fixed gas flow rate, the carbon-based species and/or free radicals in the hot gas stream, which are responsible for diamond-coating formation, progressively change in concentration as the gas stream passes through the porous preform. Hence, the deposition rate varies continuously throughout the preform. This effect may be mitigated by starting with a high gas flow rate (short residence time), and progressively diminishing it. Thus, the deposition rate gradually shifts from high to low at one end of the preform, while the opposite effect occurs at the other end of the preform. Thus, a uniform diamond coating can be realized, thereby ensuring uniform properties in the final D/C or D/SiC composite.

A SiC/SiC composite is much less prone to high temperature oxidation than a C/C composite, since it forms a protective scale of $SiO_2$. Hence, the final step in the fabrication of a D/C or D/SiC composite is the application of an overlay coating of SiC, also applied by IDF-deposition using an appropriate metalorganic precursor (e.g. tetramethylsilane). A boron-doped SiC coating is of particular interest, since it is known that the oxidation product (borosilicate glass) is a viscous liquid at high temperature, so that surface cracking duet to thermal-shock is avoided.

B. Nanofiber-reinforced Composites

In the instant invention, a thin Ni grid is used upon which to grow a network of CNTs, thereby placing the Ni-supported CNTs just above the IDF burner and depositing a uniform layer of diamond on all the fibers. After deposition, the rigid but still highly porous diamond-coated CNT preform is infiltrated with a thermosetting or thermoplastic polymer to form a D/CNT-reinforced PMC.

It is known that heat treating a mixture of graphite and diamond particles in a $H_2$-rich gas stream can cause selective gasification of the graphite component. Using this for diamond-coated CNTs, the resulting diamond nanotubes (DNTs) may also be used to reinforce PMCs, owing to their exceptionally high strength and stiffness. Good load transfer from polmer matrix to DNTs under tensile loading is desirable. One option is to dope the diamond with B and/or N to provide active sites (dangling bonds) to promote matrix/CNT bonding. This is readily accomplished using the IDF process by making additions of borane ($BH_3$) and/or ammonia ($NH_3$) to the hydrocarbon feed stream.

Silicon carbide is stable in air at temperatures exceeding 1000° C., whereas CNTs are limited to 600° C. Hence, there is growing interest in developing SiC nanotubes (SiCNTs) for high temperature applications. SiCNTs may be synthesized by catalytic and chemical conversion methods. Diamond-coating of SiCNT's using IDF technology enables the fabrication of a new class of D/SiCNT-reinforced CMCs for high temperature structural applications.

C. Laminated Composites

A typical laminated composite comprises layers of fiber-reinforced composites that are bonded together to provide high in-plane strength and stiffness, and other desirable properties, such as low thermal expansion coefficient. Individual layers may comprise, without limitation, high-strength fibers in a polymer, metal or ceramic matrix. Reinforcing fibers may comprise, without limitation, carbon, graphite, glass, or silicon carbide. Matrix materials may consist of epoxy resin, polyimide, aluminum, or titanium. Layers of different materials may be used to create hybrid composite laminates. The individual layers may also be designed to yield orthotropic properties (i.e. with principal properties in orthogonal directions), or transversely isotropic (i.e. with isotropic properties in the transverse plane). Depending upon the stacking sequence of the individual layers, the laminated composite may exhibit coupling between in-plane and out-of-plane mechanical properties.

Coating individual fibers of a polymer, metal or ceramic matrix composite with nano/microcrystalline diamond see, e.g., FIG. 16) enhances specific strength and stiffness of the composite. This translates into improved properties and performance of fiber-reinforced composites, irrespective of whether they are of isotropic, orthotropic, or hybrid designs. For strictly layered composites, comprising stacked arrays of different materials, coating with diamond benefits some applications including, without limitation, personnel and vehicular armor. Backing such layered composites with strong and tough fiber-reinforced composites, with diamond (and other hard materials (e.g., SiC, TiC, B4C, c-BN, and the like)) coatings of the fibers, is advantageous.

Other Embodiments

The multiple inverse diffusion flame can also be used to synthesize heterojunctions and different band gap nanomaterials. An example is the use of a multiple inverse diffusion flame to grow metal oxide-carbide-nitride-boride nanostructures (e.g., nanowires) directly on substrates, either alone or in combination with carbon-based materials, such as CNTs. Production of non-oxide materials, such as III-Nitrides and various carbides and borides, are also possible through the introduction of the appropriate precursors (either liquid or vapor). Again, the precursors do not traverse through the reaction zone. Oxide nanostructures can also be grown via hydrolysis and $CO_2$/CO routes due to all oxygen being consumed in the flame zones.

The invention is compatible with current technology on surface modification and wafer growth using CVD, but with the aforementioned advantages and efficiencies. As such, the burner can serve as a new delivery system for current CVD applications. The substrate can also be placed parallel to the flow coming from the burner (not stagnation point flow), resulting in a growing boundary layer (e.g., FIG. 11). Strategic implementation of such an arrangement affords a favorable gradient in species concentration to allow continuous front-growth rather than discrete island-growth of graphene sheets.

The following example describes illustrative methods of practicing the instant invention and is not intended to limit the scope of the invention in any way.

EXAMPLE

Carbon Nanotube Synthesis

Figure 3:
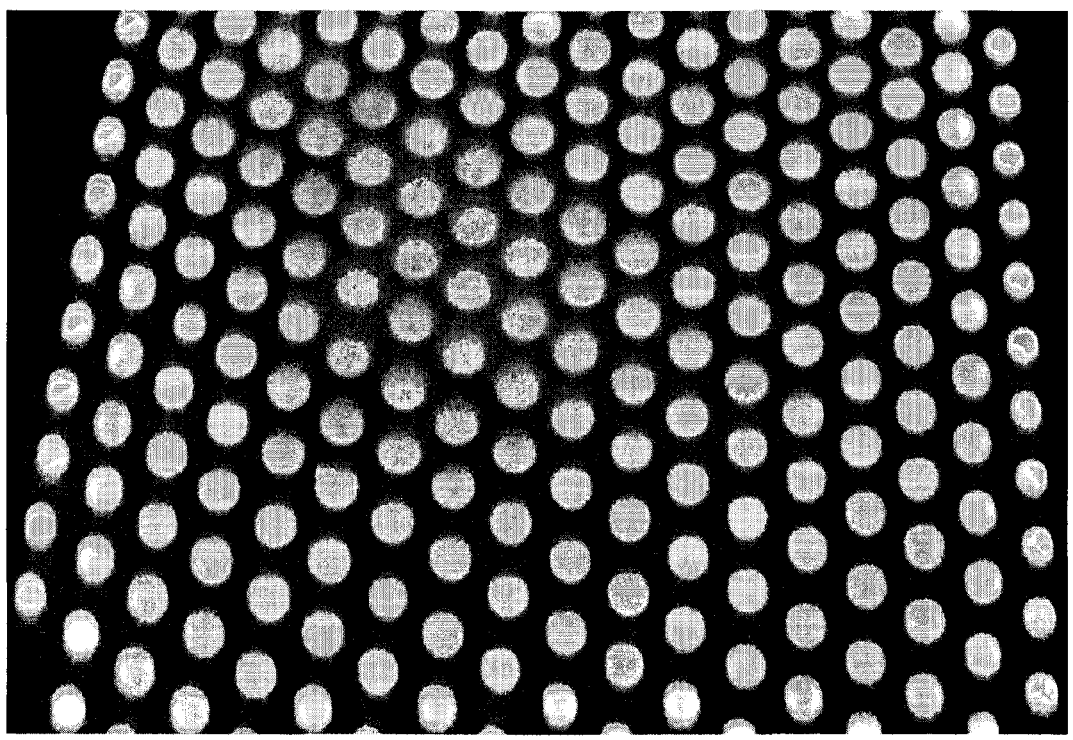
Figure 4:
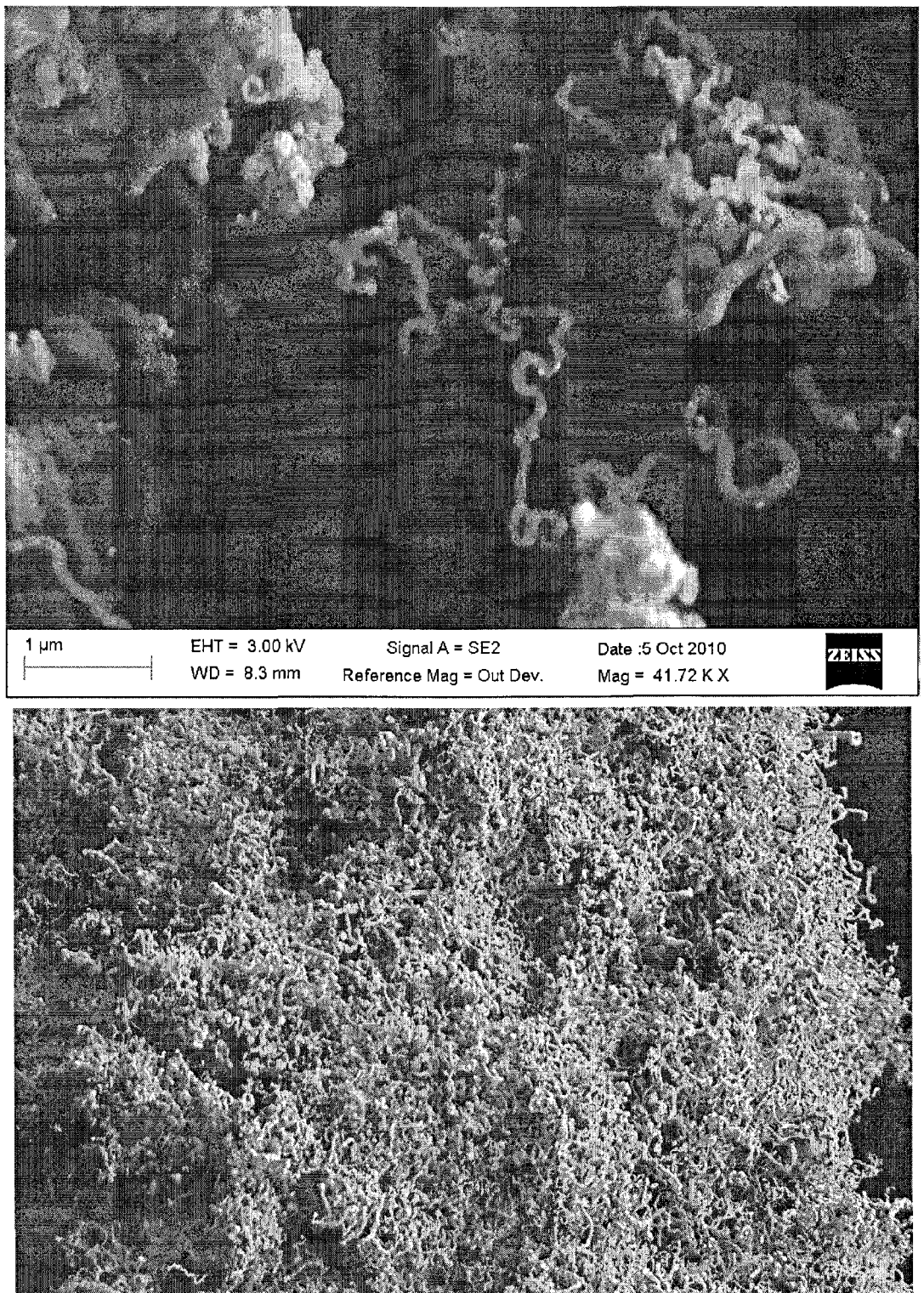
Figure 5:
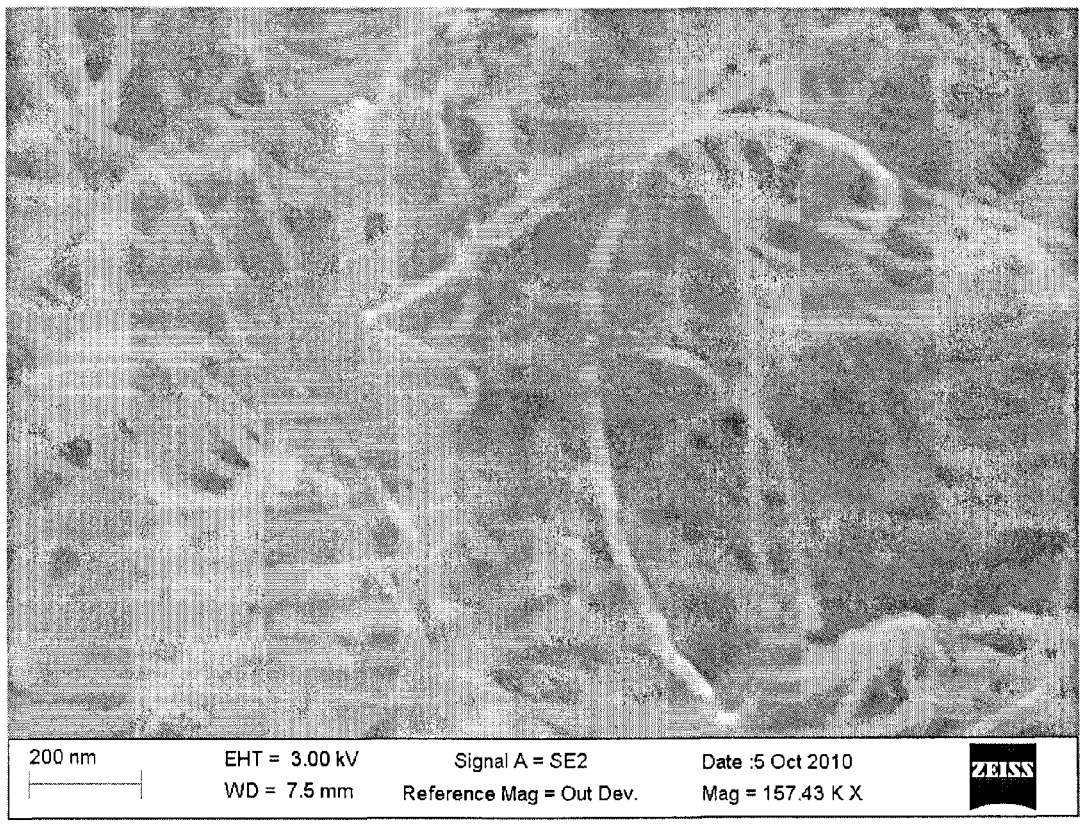
Figure 5:
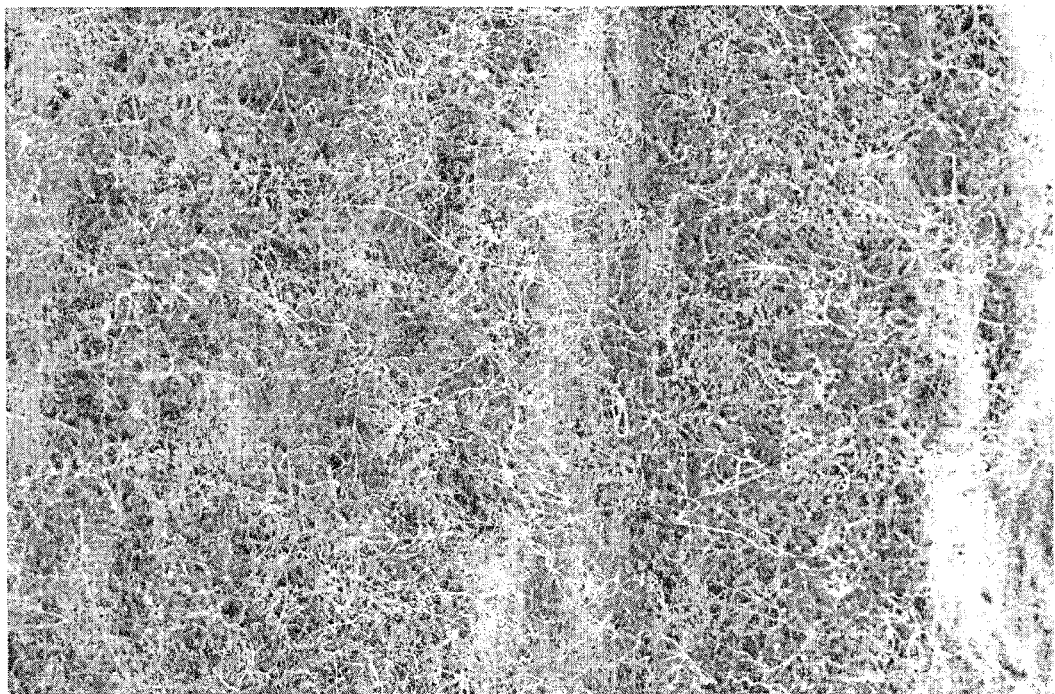
Figure 6:
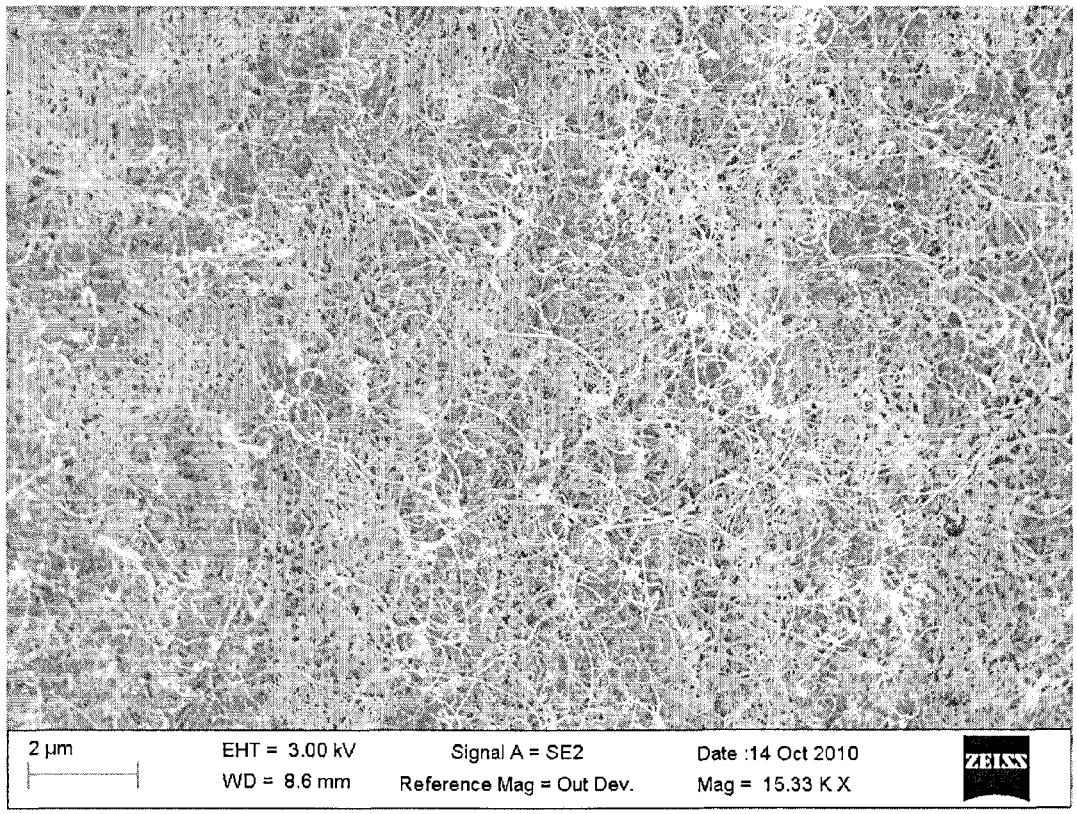

FIG. 3 shows the multiple inverse diffusion flames used for carbon nanotube (CNT) synthesis. Small individual flames are clearly seen with no soot present. Ethylene diluted with nitrogen is used as the fuel source. A quartz cylinder encompasses the entire setup to prevent oxidizer permeation from the ambient. Transition-metal substrates with different compositions are inserted radially at specific locations above the burner to induce catalyst nanoparticle formation (from the substrate) and subsequent CNT growth; the substrate is held at the same position for 10 minutes. FIGS. 4-7 depict the growth of CNTs on different metal substrates. CNTs can also be grown directly on particles, e.g. metal-oxide spinel or carbon particles seeded with transition metal clusters.

Graphene Synthesis

Figure 7:
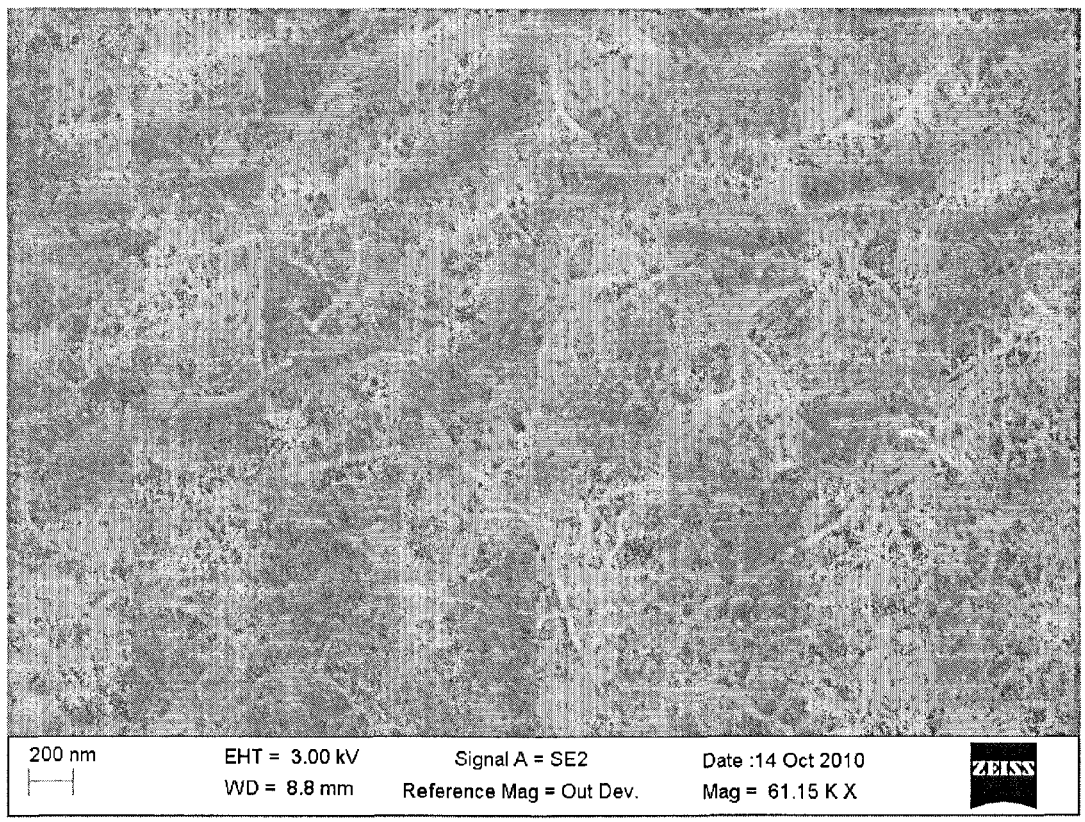
Figure 8:
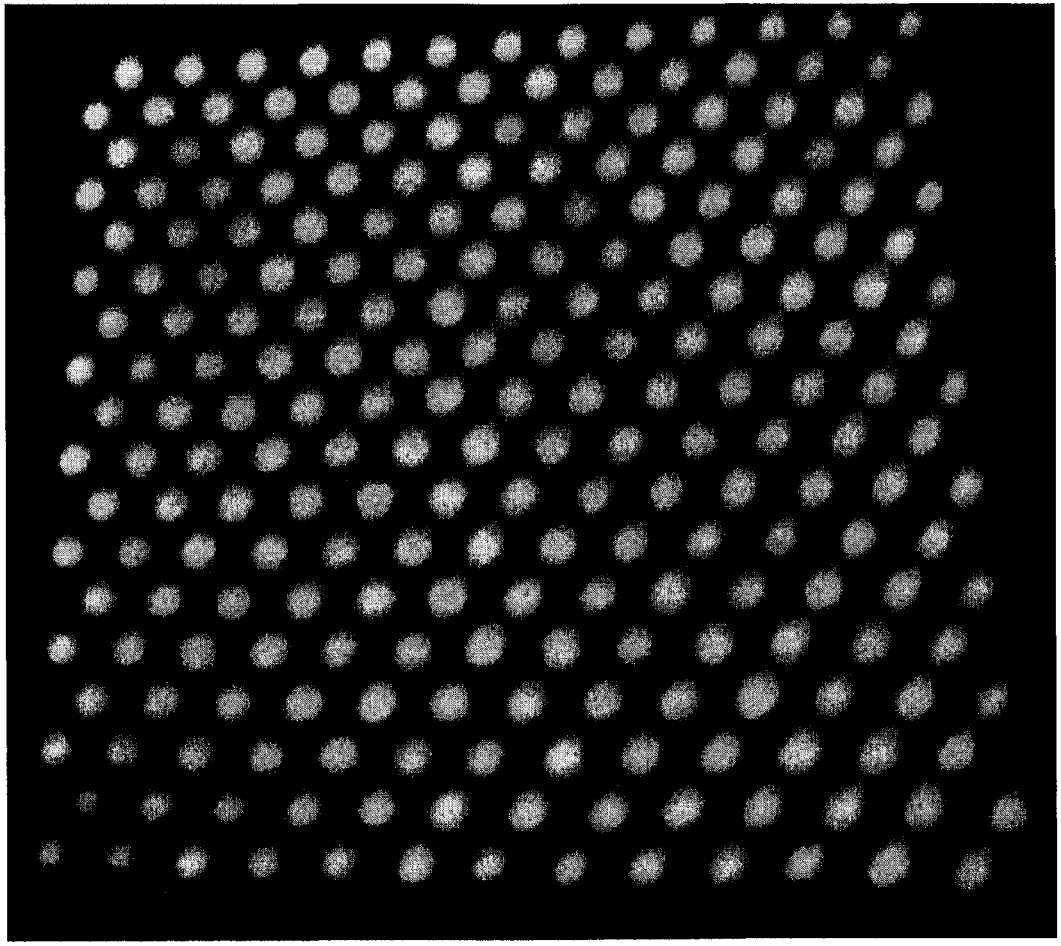
Figure 9A:
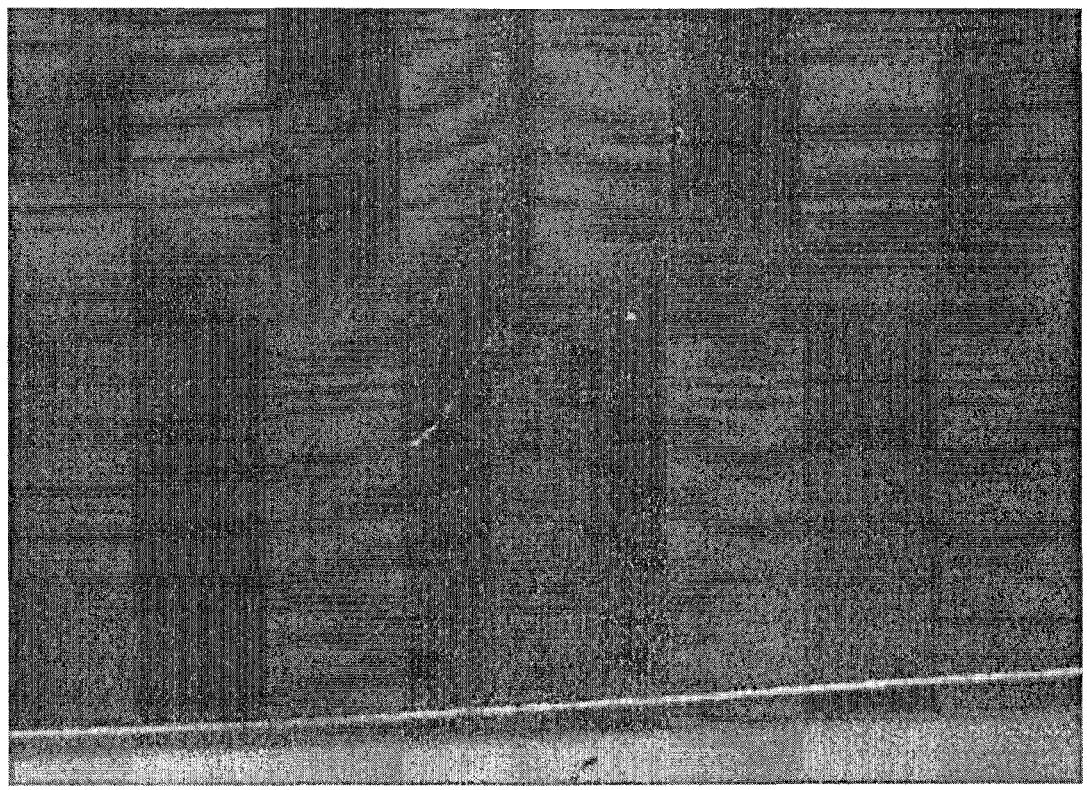
FIG. 9A shows graphene layers grown on nickel.
Figure 9B:
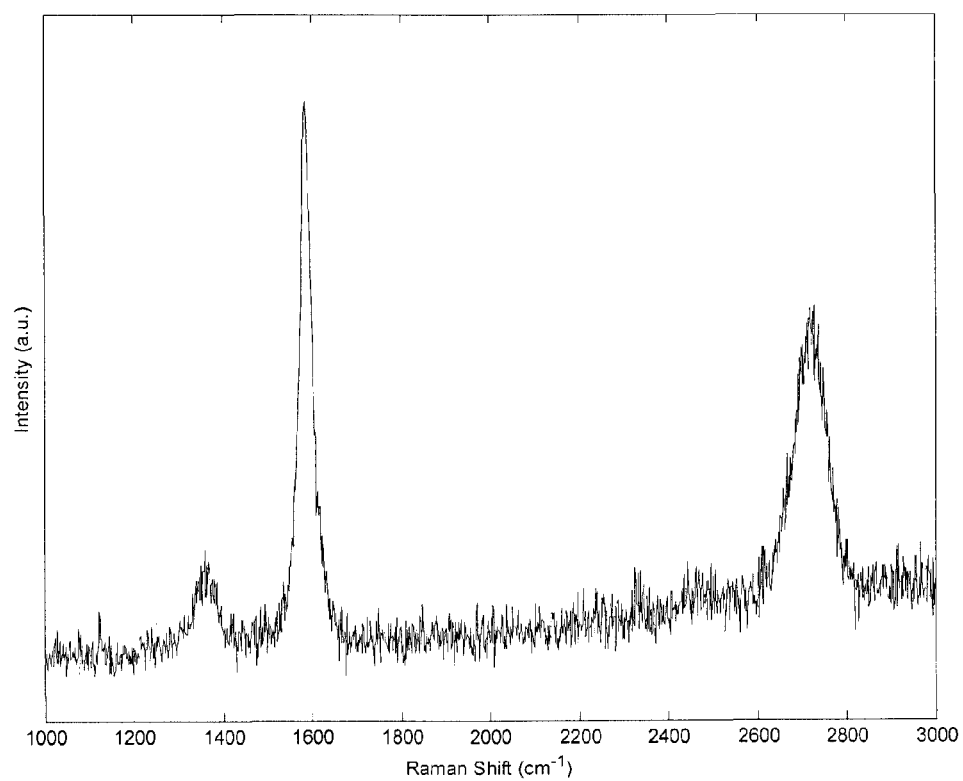
FIG. 9B shows the Raman spectra, with 514 nm excitation, from the sample, showing the presence of 5 to 8 layers of graphene.
Figure 10A:
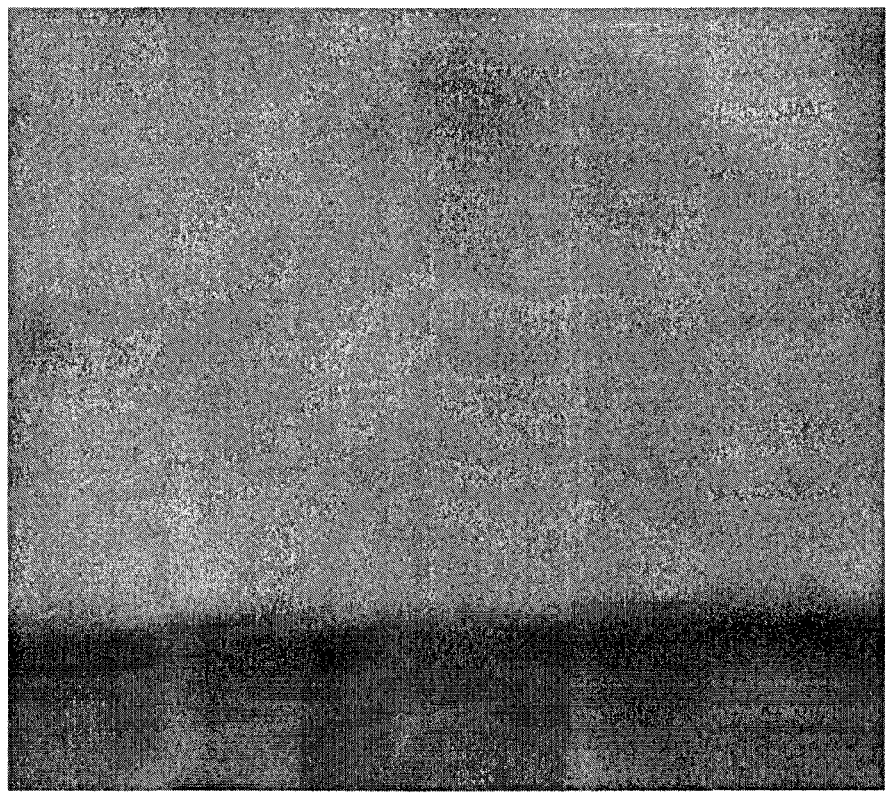
FIG. 10A shows graphene layers grown on copper.
Figure 10B:
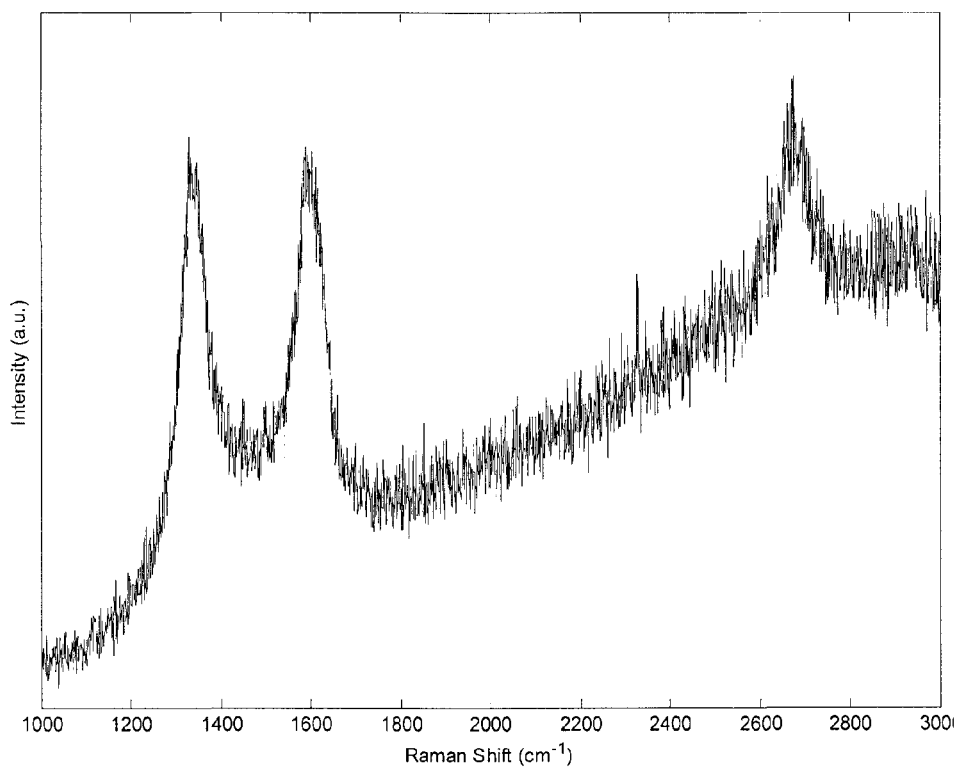
FIG. 10B shows Raman spectra, with 633 nm excitation, from the sample, showing the presence of 5 to 8 layers of grapheme.

Using the multiple-inverse-diffusion-flame burner, graphene layers on nickel and copper foils have been synthesized. Since the as-received metal foils invariably have a native oxide layer, it is necessary to pre-treat the substrate to remove this layer. For the Cu foil, acetic acid was first used to remove any oxide layer. Afterwards, the synthesis method consisted of treating the metal foils (Ni and Cu) in a hydrogen reducing atmosphere. For this, the burner is run initially with hydrogen as the sole fuel, which provides the hydrogen needed to reduce any residual oxide layer. Upon placing the metal foil above the flame for 10 minutes, a hydrocarbon gas is added to the flow (FIG. 7). The metal foil is kept in the same position for an additional 10 minutes, and then removed from above the flame. FIGS. 8 and 9 depict the graphene layers on Ni and Cu substrates. Raman spectra are used to confirm the presence of graphene (FIG. 10).

Diamond Synthesis

Using the multiple inverse diffusion flame burner, diamond crystals can be nucleated, and diamond films can been grown on metal substrates. The metal foil can be pre-treated in a hydrogen reducing atmosphere, if necessary. For this, the burner is run with hydrogen as the sole fuel. Upon placing the metal foil above the flame for ten minutes, hydrocarbon gas is added to the flow.

A number of publications and patent documents are cited throughout the foregoing specification in order to describe the state of the art to which this invention pertains. The entire disclosure of each of these citations is incorporated by reference herein.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A multiple inverse-diffusion flame (IDF) method to fabricate strengthened composites, comprising the steps of:
   a) depositing Fe or other catalyst on a substrate by thermal decomposition of a metalorganic precursor;
   b) depositing a thin coat of a hard material on the Fe or catalyst-coated substrate by low-temperature thermal decomposition of a hydrocarbon precursor; and
   c) depositing a thicker coat of the hard material on the thin-coated substrate by high-temperature thermal decomposition of a hydrocarbon precursor.

2. The method of claim 1, wherein the thin coating of step b) and thicker coating of step c) are of a hard material selected from the group consisting of diamond, SiC, TiC, $B_4C$, and cubic-BN.

3. The method of claim 1, wherein the metalorganic precursor is a volatile Fe-rich compound.

4. The method of claim 3, wherein said Fe-rich compound is iron pentcarbonyl or ferrocene.

5. The method of claim 1, where thermal decomposition of the metalorganic precursor yields a deposit of nanocrystalline Fe or other catalyst on the substrate.

6. The method of claim 1, wherein the hydrocarbon precursor is a volatile C-rich compound.

7. The method of claim 6, wherein the C-rich compound is methane or ethylene.

8. The method of claim 1, wherein low-temperature thermal decomposition of the hydrocarbon precursor yields a thin deposit of nanocrystalline diamond on the Fe-coated substrate.

9. The method of claim 8, where the nanocrystalline diamond serves as a substrate for high-temperature thermal decomposition of the hydrocarbon precursor to develop an overlay coating of textured microcrystalline diamond.

10. The method of claim 1, where the substrate is a fiber material.

11. The method of claim 10, wherein the fiber material is C or SiC.

12. The method of claim 1, wherein the substrate is a film/sheet material.

13. The method of claim 12, wherein the film/sheet material comprises a polymer, metal, or ceramic.

14. The method of claim 13, wherein said fabricate strengthened composite is a fiber-reinforced polymer-matrix composites (PMCs), metal-matrix composites (MMCs), or ceramic-matrix composites (CMCs) with diamond-coated fibers.

15. The method of claim 12, wherein the polymer-, metal-, or ceramic-matrix composites are laminated with diamond/graphene-coated film/sheet materials.

16. The method of claim 10, wherein the fiber materials are woven-fiber materials and wherein the resultant composites contain residual porosity.

17. The method of claim 16, wherein the residual porosity is filled by pressure-infiltration of a compatible liquid phase.

18. The method of claim 10, wherein the fiber materials are woven-fiber materials and wherein the woven-fiber materials are infiltrated with a hard material selected from the group consisting of diamond, SiC, TiC, $B_4C$, and cubic-BN by varying the gas flow rate to obtain uniform through-thickness deposition.

19. The method of claim 18, wherein the substrate is carbon nanotubes (CNTs) or silicon-carbide nanotubes (SiCNTs).

20. The method of claim 19, further comprising fabricating D/CNT-reinforced PMCs or D/SiCNT-reinforced CMCs from the diamond-coated CNTs or SiCNTs.

21. The method of claim 19, further comprising removing the CNT component of the diamond-coated CNT by selective gasification in a hydrogen-rich gas stream, thereby forming diamond nanotubes (DNTs).

22. The method of claim 21, wherein the DNTs reinforce PMCs or CMCs.

* * * * *